(12) United States Patent
Yamaguchi et al.

(10) Patent No.: US 9,377,089 B2
(45) Date of Patent: Jun. 28, 2016

(54) CHAIN TENSIONING DEVICE

(71) Applicant: Shimano Inc., Sakai, Osaka (JP)

(72) Inventors: Sota Yamaguchi, Osaka (JP); Toyoto Shirai, Osaka (JP); Masanori Taniguchi, Osaka (JP)

(73) Assignee: Shimano Inc., Osaka (JP)

( * ) Notice: Subject to any disclaimer, the term of this patent is extended or adjusted under 35 U.S.C. 154(b) by 85 days.

(21) Appl. No.: 14/025,733

(22) Filed: Sep. 12, 2013

(65) Prior Publication Data

US 2015/0072816 A1 Mar. 12, 2015

(51) Int. Cl.
| | | |
|---|---|---|
| *F16H 9/00* | (2006.01) | |
| *F16H 59/00* | (2006.01) | |
| *F16H 61/00* | (2006.01) | |
| *F16H 63/00* | (2006.01) | |
| *F16H 7/08* | (2006.01) | |
| *B62M 9/16* | (2006.01) | |

(52) U.S. Cl.
CPC ............... *F16H 7/0829* (2013.01); *B62M 9/16* (2013.01)

(58) Field of Classification Search
CPC ...... B62M 9/126; B62M 25/08; B62M 9/122; B62M 9/1342; B62M 9/136
USPC ...................................... 474/80, 82
See application file for complete search history.

(56) References Cited

U.S. PATENT DOCUMENTS

| | | | | |
|---|---|---|---|---|
| 4,563,167 A | * | 1/1986 | Foster | 474/135 |
| 4,599,079 A | * | 7/1986 | Chappell | 474/80 |
| 4,850,940 A | * | 7/1989 | Nagano | 474/80 |
| 4,942,947 A | * | 7/1990 | Shtarkman | 188/267.2 |
| 5,655,982 A | * | 8/1997 | Fyfe | 474/80 |
| 5,890,979 A | * | 4/1999 | Wendler | 474/82 |
| 6,012,999 A | * | 1/2000 | Patterson | 474/80 |
| 6,042,495 A | * | 3/2000 | Patterson et al. | 474/80 |
| 6,135,904 A | * | 10/2000 | Guthrie | 474/82 |
| 6,293,881 B1 | * | 9/2001 | Ichida | 474/80 |
| 6,325,733 B1 | * | 12/2001 | Patterson et al. | 474/80 |
| 6,638,190 B2 | * | 10/2003 | Patterson et al. | 474/82 |
| 7,032,475 B2 | * | 4/2006 | Ichida et al. | 74/502.2 |
| 7,137,314 B2 | * | 11/2006 | Ichida et al. | 74/502.2 |
| 7,219,574 B2 | * | 5/2007 | Ichida et al. | 74/502.2 |
| 7,549,662 B2 | * | 6/2009 | Righi et al. | 280/257 |
| 8,870,692 B2 | * | 10/2014 | Yamaguchi et al. | 474/80 |
| 8,870,693 B2 | * | 10/2014 | Shahana et al. | 474/80 |
| 8,900,078 B2 | * | 12/2014 | Yamaguchi et al. | 474/80 |

(Continued)

FOREIGN PATENT DOCUMENTS

| | | |
|---|---|---|
| JP | 2-296024 A | 12/1990 |
| JP | 5-44761 A | 2/1993 |

(Continued)

*Primary Examiner* — Henry Liu
(74) *Attorney, Agent, or Firm* — Global IP Counselors

(57) ABSTRACT

A chain tensioning device is basically provided with a main body, a chain guide, a rotary fluid damper unit and a rotational resistance adjustment device. The main body is configured to be mounted to a bicycle. The chain guide is pivotally coupled to the main body to rotate around a rotational axis with respect to the main body. The rotary fluid damper unit is operatively connected between the main body and the chain guide to provide rotational resistance to the chain guide around the rotational axis. The rotational resistance adjustment device is operatively connected to the rotary fluid damper unit to change a rotational resistance setting of the rotary fluid damper unit with the rotational resistance adjustment device in an operative state.

13 Claims, 16 Drawing Sheets

(56) References Cited

U.S. PATENT DOCUMENTS

| | | |
|---|---|---|
| 2002/0058558 A1* | 5/2002 | Patterson et al. ............... 474/82 |
| 2002/0187867 A1* | 12/2002 | Ichida et al. .................... 474/82 |
| 2006/0191756 A1* | 8/2006 | Moradian ............... F16F 9/146 |
| | | 188/296 |
| 2007/0173360 A1* | 7/2007 | Shahana et al. ................. 474/82 |
| 2007/0219029 A1* | 9/2007 | Turner ........................... 474/80 |
| 2009/0045601 A1* | 2/2009 | Colegrove et al. ............ 280/284 |

FOREIGN PATENT DOCUMENTS

| | | |
|---|---|---|
| JP | 11-82593 A | 3/1999 |
| JP | 2008-8418 A | 1/2008 |
| WO | 2007/106867 A2 | 9/2007 |

* cited by examiner

CHAIN TENSIONING DEVICE

BACKGROUND

1. Field of the Invention

This invention generally relates to a chain tensioning device. More specifically, the present invention relates to a chain tensioning device that is provided with a damper unit, which slows sudden movement of the chain guide in at least one direction.

2. Background Information

A bicycle typically uses a chain drive transmission for transmitting a pedaling force to a rear wheel. Many bicycles having a chain drive transmission either use an internally geared hub or a pair of derailleurs to selectively change speeds. In the case of an internally geared hub, a chain tensioning device (also called a chain tensioner) is used to keep the proper tension on the chain. In the case of a chain drive transmission using a pair of derailleurs, the rear derailleur is usually configured to provide the proper tension on the chain. Thus, the rear derailleur is a type of a chain tensioning device that is also used to shift the chain between rear sprockets. A typical rear derailleur has a base member, a movable member pivotally supporting a chain guide and a linkage assembly (e.g., a moving mechanism) coupled between the base member and the movable member so that the chain guide moves laterally relative to the base member. The rear derailleur typically has a biasing element that is provided between the movable member and the chain guide to bias the chain guide in a direction to take up slack in the chain.

In some cases, a chain tensioning device is provided with a damper to slow changes in chain tension. An example of a chain tensioning device that is provided with a damper is disclosed in International Patent Application Publication No. WO 2007/106897. The chain tensioning device disclosed in this international patent application publication is a rear derailleur in which the damper includes a one-way valve to slow changes in chain tension in one rotational direction of the chain guide more than the other rotational direction of the chain guide. Another example of a rear derailleur (i.e., a chain tensioning device) is disclosed in U.S. Pat. No. 6,135,904.

SUMMARY

Generally, the present disclosure discloses various features of a chain tensioning device for a bicycle. As mentioned above, a chain tensioning device (also called a chain tensioner) is used to keep the proper tension on a chain that is used in a bicycle chain drive transmission. In one feature, the chain tensioning device is provided that includes a main body, a chain guide pivotally coupled to the main body and a rotary fluid damper unit that provides rotational resistance to the chain guide around a rotational axis.

In view of the state of the known technology and in accordance with a first aspect of the present disclosure, a chain tensioning device is provided that basically comprises a main body, a chain guide, a rotary fluid damper unit and a rotational resistance adjustment device. The main body is configured to be mounted to a bicycle. The chain guide is pivotally coupled to the main body to rotate around a rotational axis with respect to the main body. The rotary fluid damper unit is operatively connected between the main body and the chain guide to provide rotational resistance to the chain guide around the rotational axis. The rotational resistance adjustment device is operatively connected to the rotary fluid damper unit to change a rotational resistance setting of the rotary fluid damper unit with the rotational resistance adjustment device in an operative state.

In accordance with a second aspect, the chain tensioning device according to the first aspect is configured so that the rotational resistance adjustment device is configured to be operated from outside of the rotary fluid damper unit.

In accordance with a third aspect, the chain tensioning device according to the first aspect is configured so that the rotary fluid damper unit includes a magnetorheological fluid, and the rotational resistance adjustment device includes an electromagnet that is arranged to produce a magnetic field in the magnetorheological fluid.

In accordance with a fourth aspect, the chain tensioning device according to the first aspect is configured so that the rotary fluid damper unit includes a magnetorheological fluid, and the rotational resistance adjustment device includes a permanent magnet that is arranged to produce a magnetic field in the magnetorheological fluid.

In accordance with a fifth aspect, the chain tensioning device according to the fourth aspect is configured so that the permanent magnet is adjustably mounted to the rotary fluid damper unit between at a first position and a second position to change a distance of the permanent magnet from the magnetorheological fluid.

In accordance with a sixth aspect, the chain tensioning device according to the fourth aspect is configured so that the permanent magnet is adjustably mounted to the rotary fluid damper unit between at a first position and a second position to change a distance of the permanent magnet from a flow limiting orifice of the rotary fluid damper unit.

In accordance with a seventh aspect, the chain tensioning device according to the fourth aspect is configured so that the permanent magnet is detachably mounted to the rotary fluid damper unit.

In accordance with an eighth aspect, the chain tensioning device according to the first aspect is configured so that the rotary fluid damper unit includes an outer member that is fixed to the main body and an inner member that is fixed to the chain guide, the inner member being rotatably disposed inside of the outer member to define a fluid cavity that is filled with a fluid, at least one of the outer member and the inner member having a flow limiting orifice.

In accordance with a ninth aspect, the chain tensioning device according to the eighth aspect is configured so that the flow limiting orifice is disposed on the outer member.

In accordance with a tenth aspect, the chain tensioning device according to the ninth aspect is configured so that the rotational resistance adjustment device includes an orifice regulator that changes a size of the flow limiting orifice.

In accordance with an eleventh aspect, the chain tensioning device according to the tenth aspect is configured so that the orifice regulator is a manually adjustable member.

In accordance with a twelfth aspect, the chain tensioning device according to the tenth aspect is configured so that the orifice regulator includes an actuator and a bolt operatively connected to the actuator, the bolt being movably mounted relative to the outer member to change the size of the flow limiting orifice.

In accordance with a thirteenth aspect, the chain tensioning device according to the first aspect is configured so that the main body includes a base member, a movable member and a moving structure operatively coupled between the base member and the movable member to move the movable member and the chain guide relative to the base member. The rotary fluid damper unit is disposed on the movable member.

In accordance with a fourteenth aspect, the chain tensioning device according to the thirteenth aspect is configured so that the rotary fluid damper unit includes an outer member that is fixed to the movable member and an inner member that is fixed to the chain guide, the inner member being rotatably disposed inside of the outer member to define a fluid cavity that is filled with a fluid, at least one of the outer member and the inner member having a flow limiting orifice.

In accordance with a fifteenth aspect, the chain tensioning device according to the first aspect is configured so that the chain guide includes at least one pulley.

In accordance with a sixteenth aspect, the chain tensioning device according to the first aspect further comprises a biasing element biasing the chain guide in a first rotational direction around the rotational axis with respect to the main body, and the rotary fluid damper unit provides a higher degree of rotational resistance in a second rotational direction, which is opposite to the first rotational direction.

Also other objects, features, aspects and advantages of the disclosed chain tensioning device will become apparent to those skilled in the art from the following detailed description, which, taken in conjunction with the annexed drawings, discloses embodiments of the chain tensioning devices.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
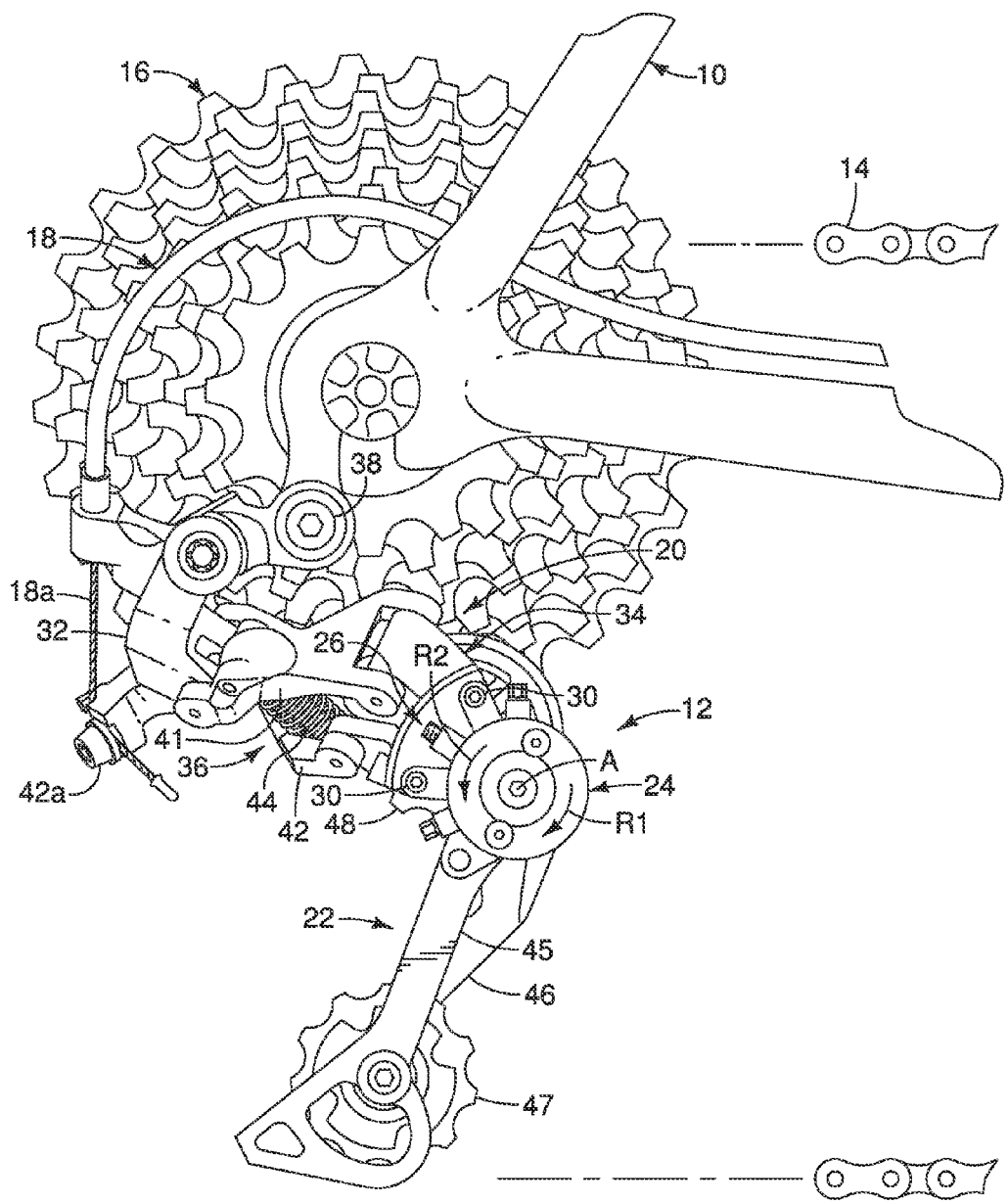
FIG. 1 is a partial side elevational view of a rear frame portion of a bicycle with a bicycle rear derailleur (i.e., a chain tensioning device) in accordance with one illustrated embodiment.

Referring initially to FIG. 1, a portion of a bicycle 10 is illustrated that includes a bicycle rear derailleur 12 (i.e., a chain tensioning device) in accordance with a first embodiment. The bicycle rear derailleur 12 is configured to shift a chain 14 between adjacent ones of a plurality of rear sprockets 16 in a conventional manner. In the first embodiment, the bicycle rear derailleur 12 is operated by a Bowden cable 18 in a conventional manner. However, the bicycle rear derailleur 12 is not limited to a cable operated derailleur. In other words, it will be apparent to those skilled in the bicycle field from this disclosure that the bicycle rear derailleur 12 can include an actuator such a motor, a pneumatic actuator, or the like for shifting the chain 14 between the rear sprockets 16.

The bicycle rear derailleur 12 (i.e., a chain tensioning device) basically comprises a main body 20, a chain guide 22, a rotary fluid damper unit 24 and a rotational resistance adjustment device 26. The main body 20 is configured to be mounted to the bicycle 10 in a detachable and reinstallable manner. The chain guide 22 is pivotally coupled to the main body 20 to rotate around a rotational axis A with respect to the main body 20. The rotary fluid damper unit 24 is operatively connected between the main body 20 and the chain guide 22 to provide rotational resistance to the chain guide 22 around the rotational axis A. The rotational resistance adjustment device 26 is operatively connected to the rotary fluid damper unit 24 to change a rotational resistance setting of the rotary fluid damper unit 24 with the rotational resistance adjustment device 26 in an operative state. While the rotary fluid damper unit 24 is used in a rear derailleur, it will be apparent to those skilled in the bicycle field from this disclosure that the rotary fluid damper unit 24 can be used as merely a chain tensioning device (also called a chain tensioner) that is used with an internally geared hub or by itself. The rotary fluid damper unit 24 slows sudden movement of the chain guide in at least one direction. The rotary fluid damper unit 24 is a one-way rotary damper that provides different rotational resistance in different rotational directions.

Figure 2:
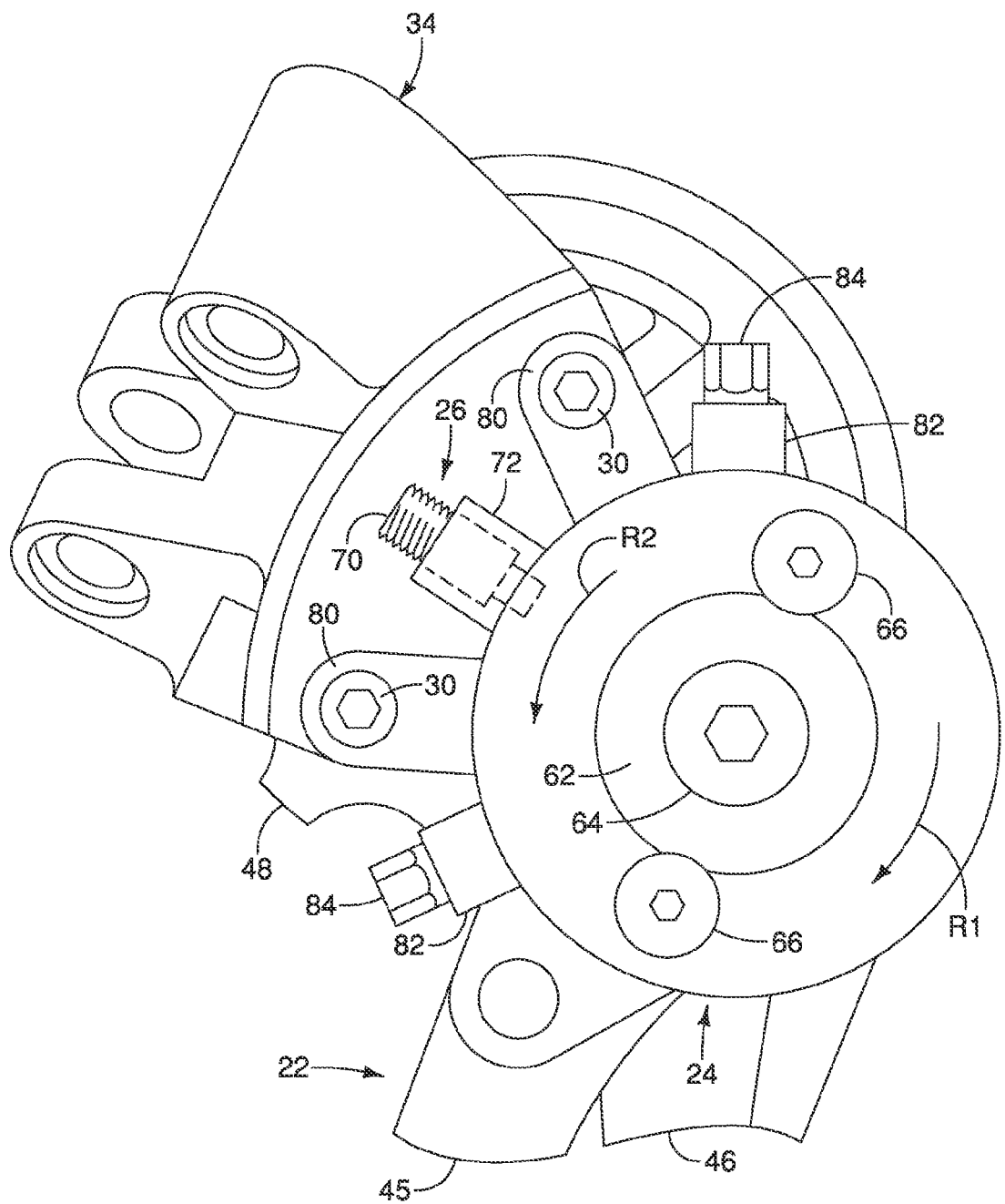
FIG. 2 is a partial, enlarged side elevational view of the movable member, the chain guide and the rotary fluid damper unit of the rear derailleur illustrated in FIG. 1, in which the rotary fluid damper unit includes a rotational resistance adjustment device.
Figure 3:
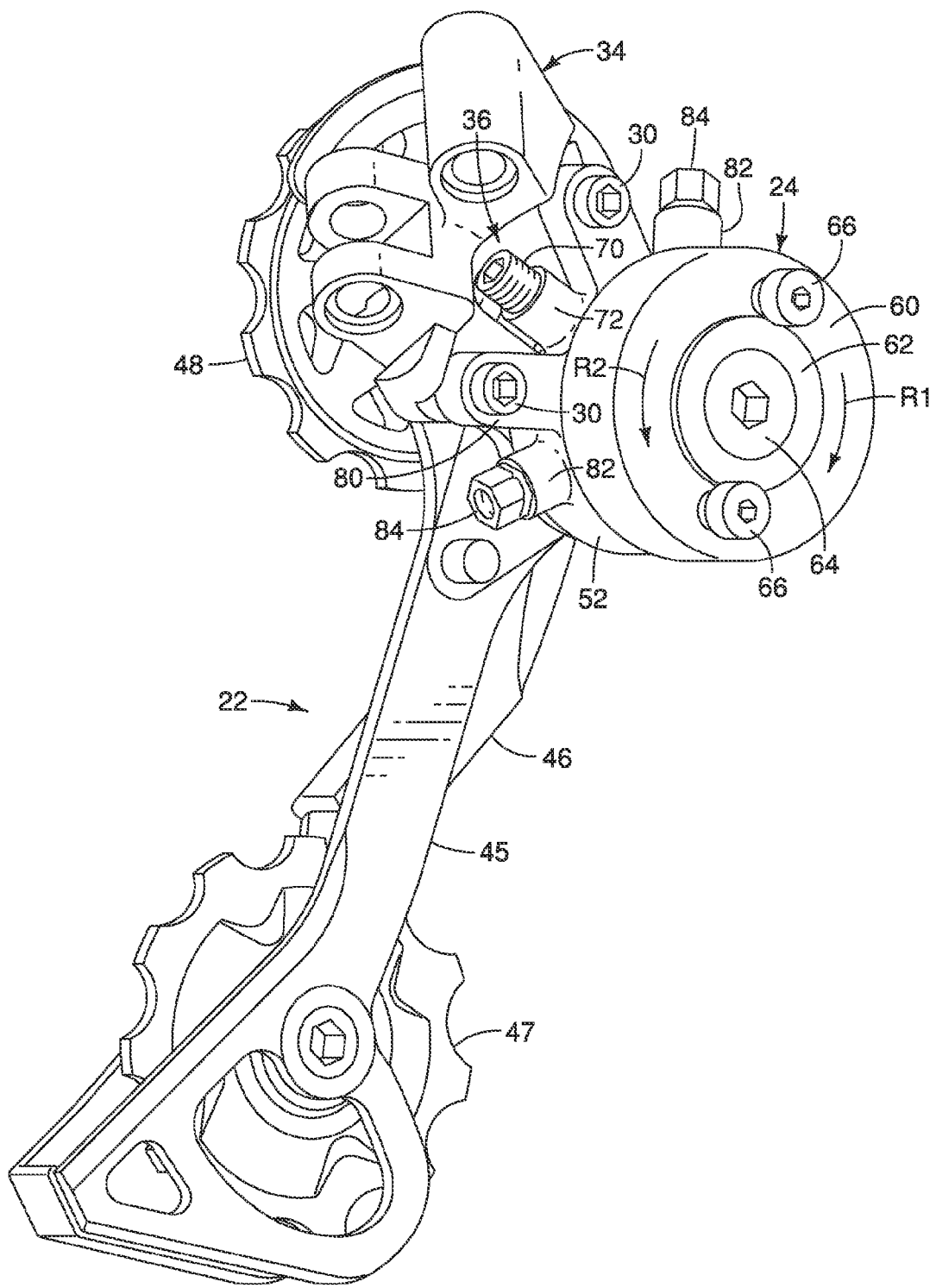
FIG. 3 is a perspective view of the movable member, the chain guide and the rotary fluid damper unit of the rear derailleur illustrated in FIGS. 1 and 2 as viewed from the non-frame facing side of the rear derailleur.

As seen in FIGS. 1 to 3, the rotary fluid damper unit 24 is a separate unit from the main body 20. Thus, the phrase "separate unit" as used herein means that the rotary fluid damper unit 24 is a self-contained and completely independent structure that can operate without any structure of the main body 20 (e.g., the housing of the rotary fluid damper unit 24 is not formed by a part of the main body 20). The rotary fluid damper unit 24 is detachably mounted on the main body 20 such that the rotary fluid damper unit 24 can be detached from the main body 20 and reinstalled on the main body 20 on the main body 20 without having to disassemble the main body 20 as explained later. Thus, the phrases "detachably mounted", "detachably attached" and the like as used herein means that the rotary fluid damper unit 24 is configured to be detached from the main body 20 and reinstalled on the main body 20 on the main body 20 without having to disassemble the main body 20. The rotary fluid damper unit 24 is detachably attached to the main body 20 while the bicycle rear derailleur 12 is mounted to the bicycle 10. The rotary fluid damper unit 24 is detachably attached to the main body 20 on a non-frame facing side of the main body 20 by at least one fastener. Here, the rotary fluid damper unit 24 is detachably attached to the main body 20 by a pair of fasteners 30. The fasteners 30 are preferably threaded fasteners such as bolts.

In the first embodiment, as seen in FIG. 1, the main body 20 includes a base member 32, a movable member 34 and a moving structure 36. The moving structure 36 is operatively coupled between the base member 32 and the movable member 34 to move the movable member 34 and the chain guide 22 relative to the base member 32. The base member 32 defines a first end of the main body 20 that releasably mounted to the bicycle via a fixing bolt 38. The movable member 34 defines a second end of the main body 20 that pivotally supports the chain guide 22 to the main body 20.

As seen in FIGS. 1 and 2, the rotary fluid damper unit 24 is disposed on the movable member 34. In particular, as seen in FIGS. 3 to 6, the movable member 34 includes a damper support portion 34a that defines an opening 34b for receiving a portion of the rotary fluid damper unit 24 therethrough. Thus, the movable member 34 of the main body 20 includes the opening 34b for receiving a portion of the rotary fluid damper unit 24 therethrough. Here, the opening 34b of the movable member 34 is circular. However, it will be apparent to those skilled in the bicycle field from this disclosure that the opening 34b can be non-circular. The movable member 34 has a pair of threaded bores 34c for threadedly receiving the fasteners 30 to fixedly secure the rotary fluid damper unit 24 to the movable member 34.

Figure 4:
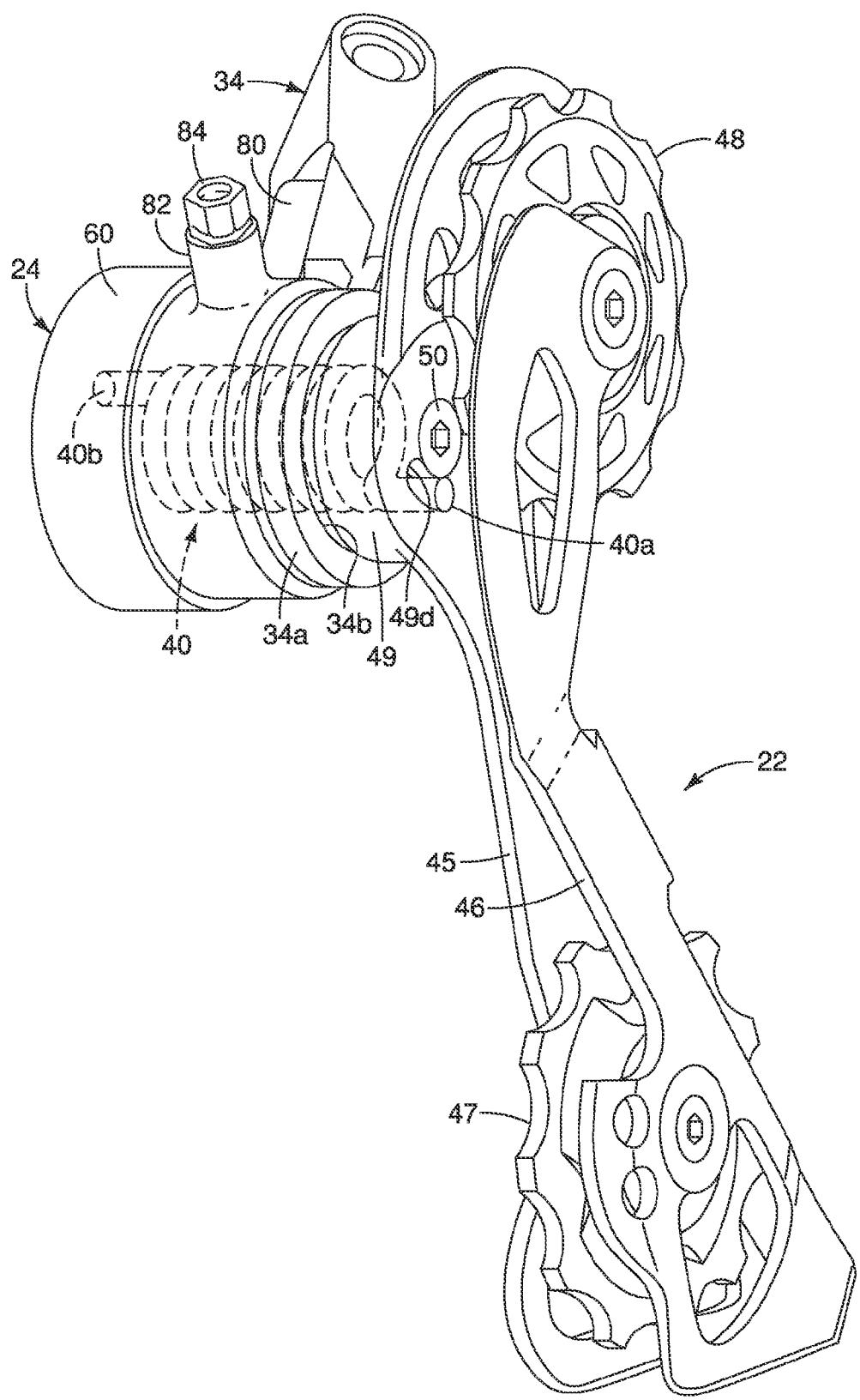
FIG. 4 is a perspective view of the movable member, the chain guide and the rotary fluid damper unit of the rear derailleur illustrated in FIGS. 1 to 3 as viewed from the frame facing side of the rear derailleur.
Figure 5:
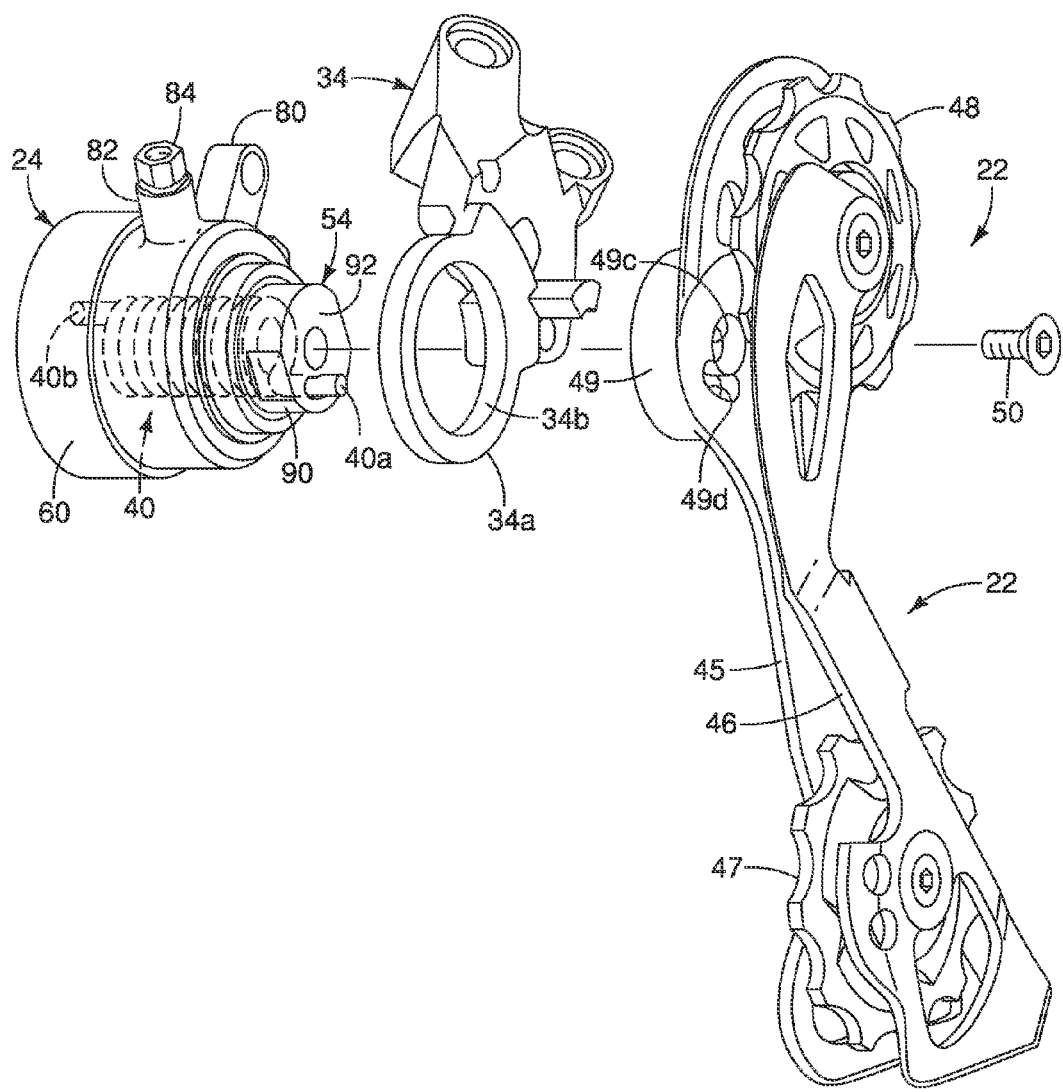
FIG. 5 is a partially exploded perspective view of the movable member, the chain guide and the rotary fluid damper unit illustrated in FIGS. 1 to 4 as viewed from the frame facing side of the rear derailleur.
Figure 7:
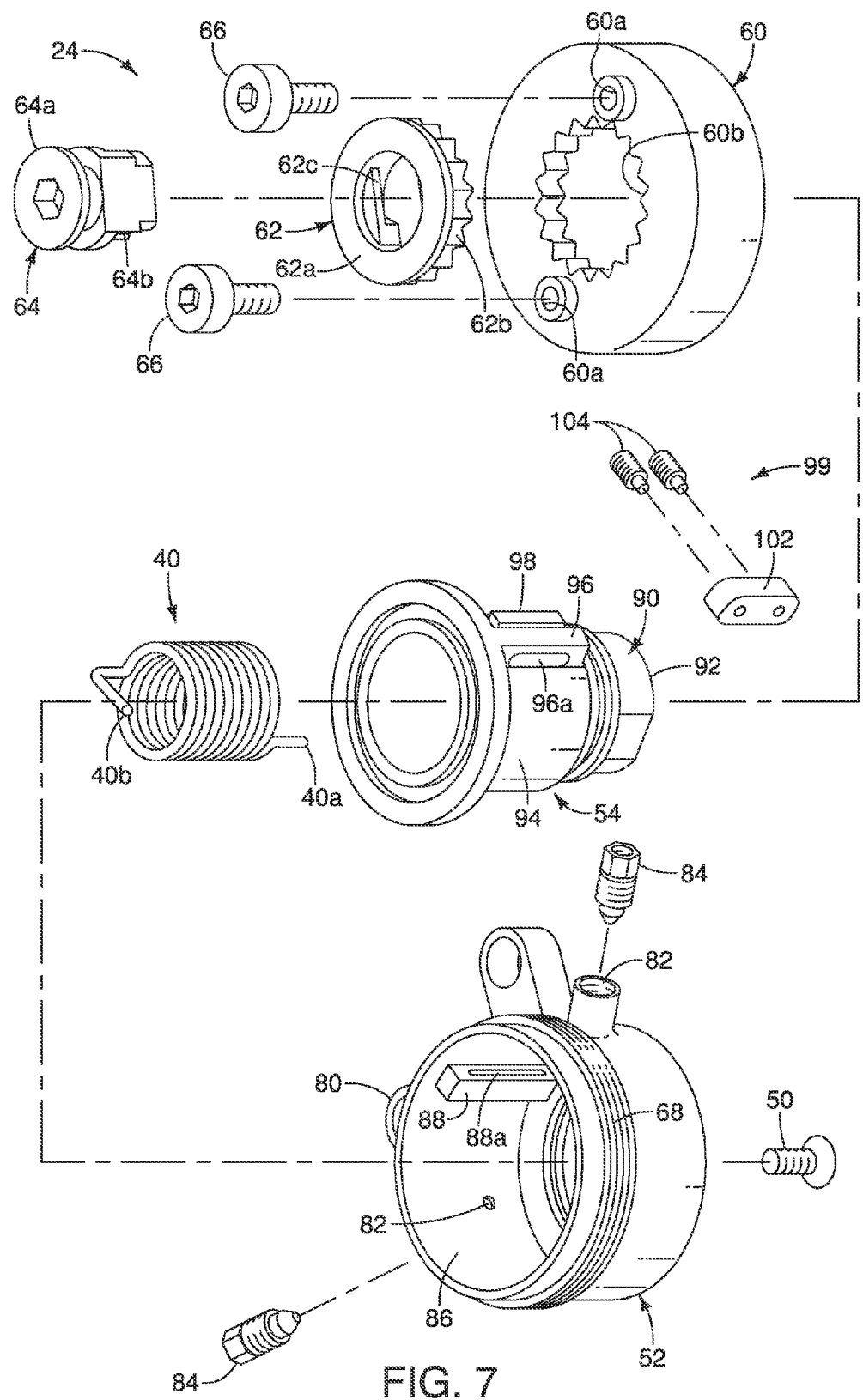
FIG. 7 is an exploded perspective view of the rotary fluid damper unit illustrated in FIGS. 1 to 6 as viewed from the non-frame facing side of the rear derailleur.

As seen in FIGS. 4, 5 and 7, the bicycle rear derailleur 12 (i.e., a chain tensioning device) further comprises a biasing element 40 that biases the chain guide 22 in a first rotational direction R1 around the rotational axis A with respect to the movable member 34 of the main body 20. As explained later, the rotary fluid damper unit 24 provides a higher degree of rotational resistance in a second rotational direction R2, which is opposite to the first rotational direction R1. Here, the biasing element 40 is a coiled torsion spring having a first end 40a that is engaged with the chain guide 22 and a second end 40b that is engaged with a portion of the rotary fluid damper unit 24 that is fixed to the movable member 34 of the main body 20.

In the first embodiment, as seen in FIG. 1, the moving structure 36 is a linkage that includes a first or outer link 41 and a second or inner link 42. The outer link 41 has a first end pivotally connected to the base member 32, and a second end pivotally connected to the movable member 34. The inner link 42 has a first end pivotally connected to the base member 32, and a second end pivotally connected to the movable member 34. Thus, the outer and inner links 41 and 42 have first ends pivotally connected to the base member 32 and second ends pivotally connected to the movable member 34 to define a four bar linkage arrangement. Here, as seen in FIG. 1, the inner link 42 has a cable attachment member or bolt 42a for attaching an inner wire 18a of the cable 18 to the inner link 42.

The moving structure 36 further includes a biasing member 44 that is interposed between the outer and inner links 41 and 42 to bias the movable member 34 towards one of a low shift stage position and a top shift stage position. In the first embodiment, the biasing member 44 is a coil tension spring that biases the movable member 34 towards the low shift stage position. As used herein, the term "top shift stage (gear) position" refers to the rear derailleur 12 being in an operating position that corresponds to the chain 14 being guided onto one of the rear sprockets 16 with the smallest number of teeth. As used herein, the term "low shift stage (gear) position" refers to the rear derailleur 12 being in an operating that corresponds to the chain 14 being guided onto one of the rear sprockets 16 with the largest number of teeth.

As seen in FIGS. 1 to 6, the chain guide 22 basically includes a first or outer chain cage plate 45, a second or inner chain cage plate 46, a first or tension pulley 47 and a second or guide pulley 48. The chain guide 22 includes at least one pulley (i.e., the first or tension pulley 47) so that the rear derailleur 12 functions as a chain tensioning device. The chain cage plates 45 and 46 define a chain receiving slot for receiving the chain 14. The pulleys 47 and 48 are both rotatably disposed between the chain cage plates 45 and 46. Here, the guide pulley 48 has its rotational axis offset from the rotational axis A of the chain guide 22. However, it will be apparent that from this disclosure that the rotational axis of the guide pulley 48 can be coincident with the rotational axis A of the chain guide 22.

Figure 6:
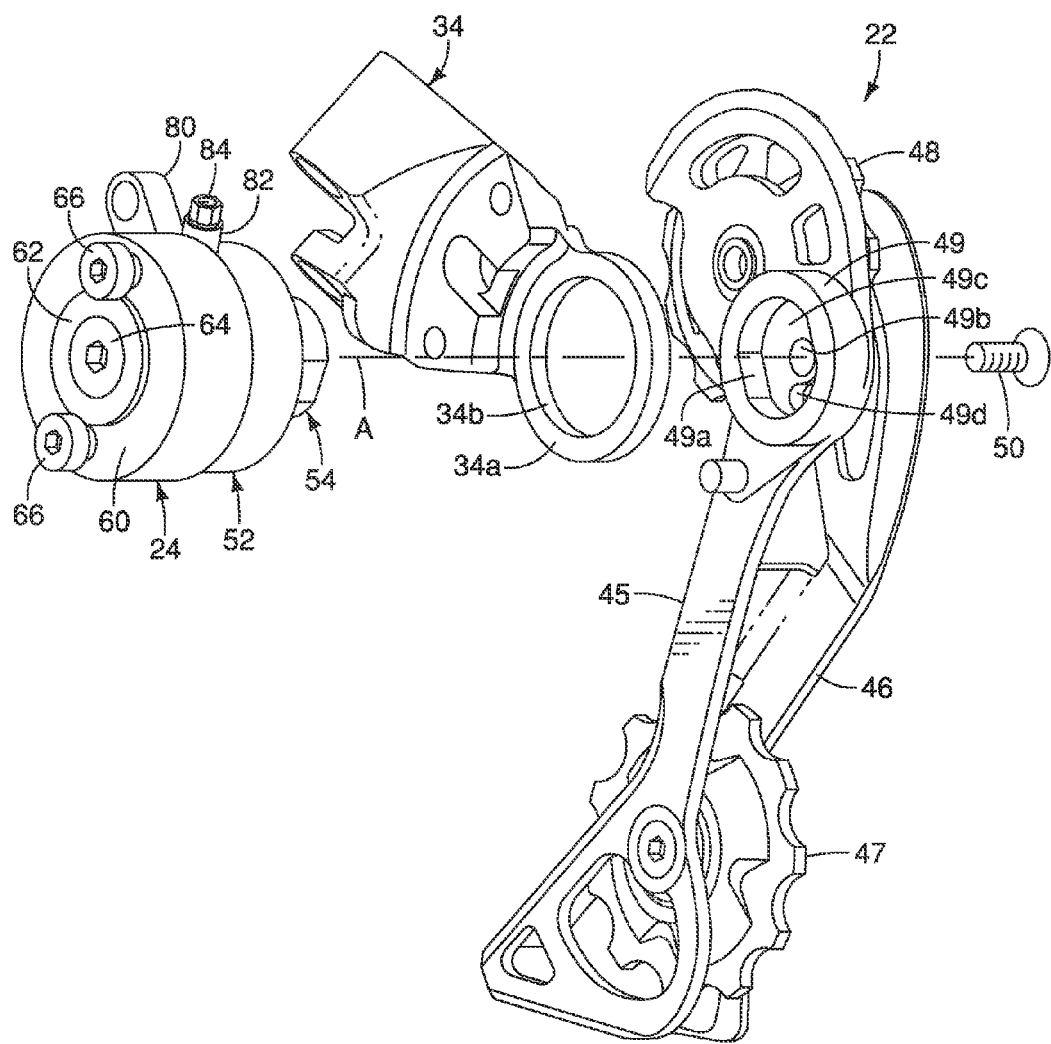
FIG. 6 is a partially exploded perspective view of the movable member, the chain guide and the rotary fluid damper unit illustrated in FIGS. 1 to 5 as viewed from the non-frame facing side of the rear derailleur.

As explained below, the chain guide 22 is fixed to a portion of the rotary fluid damper unit 24 by a fastener 50 as seen in FIG. 4. The fastener 50 is preferably threaded fastener such as a screw. The chain guide 22 is also provided with an anti-rotation structure that mates with a portion of the rotary fluid damper unit 24. In the first embodiment, as seen in FIG. 6, the outer chain cage plate 45 includes an attachment portion 49 which is coupled to the rotary fluid damper unit 24. The attachment portion 49 includes a recess 49a that has a non-circular cross section with respect to the rotational axis A. The recess 49a constitutes the anti-rotation structure of the chain guide 22. The recess 49a is a blind bore with an opening 49b in the inner end wall 49c. The fastener 50 passes through the opening 49b to fixedly secure a portion of the rotary fluid damper unit 24 to the outer chain cage plate 45 of the chain guide 22 in a non-rotatably manner. As seen in FIG. 4, the chain guide 22 also has an opening 49d for receiving the first end 40a of the biasing element 40, which biases chain guide 22 in the first rotational direction R1.

Now, the rotary fluid damper unit 24 will be discussed in more detail with reference mainly to FIGS. 4 to 10. Basically, the rotary fluid damper unit 24 is a magnetorheological damper in which a magnetic field is used to control the damping characteristics. The rotary fluid damper unit 24 basically includes an outer member 52 that is fixed to the main body 20 and an inner member 54 that is fixed to the chain guide 22. The inner member 54 is rotatably disposed inside of the outer member 52 to define a fluid cavity 56 that is filled with a magnetorheological fluid 58. In the first embodiment, the rotary fluid damper unit 24 further includes a cover member 60, a spring phase adjustment element 62 and a spring engagement element 64. The spring phase adjustment element 62 and the spring engagement element 64 are coupled together as a unit, which are attached as a unit to the cover member 60 by a pair of fasteners 66 (e.g., screws).

In the first embodiment, the rotational resistance adjustment device 26 includes a permanent magnet 70 that is arranged to produce a magnetic field in the magnetorheological fluid 58. Preferably, the rotational resistance adjustment device 26 includes a magnet support member 72 that adjustably supports the permanent magnet 70 on the outer member 52. Here, in the first embodiment, the magnet support member 72 is integrally formed with the outer member 52 as a one-piece, unitary member. In particular, the magnet support member 72 is a tube with an internal thread 72a that is threadedly engaged with an external thread 70a of the permanent magnet 70. In other words, turning the permanent magnet 70 by hand or with a tool, the permanent magnet 70 is adjustably mounted to the rotary fluid damper unit 24 between at a first position and a second position to change a distance of the permanent magnet 70 from the magnetorheological fluid. In this way, the rotational resistance adjustment device 26 is configured to be operated from outside of the rotary fluid damper unit 24. The permanent magnet 70 includes a tool engagement portion 71 that is engaged with a tool for installing the permanent magnet 70 into the magnet support member 72. The permanent magnet 70 can be made as a bolt or screw. Alternatively, a permanent magnet may be fixed on a front edge of a bolt or screw, which can be engaged to the internal thread 72a of the magnet support member 72.

The outer member 52 is a rigid member that is made of a suitable material such as a lightweight metal or a reinforced plastic. The outer member 52 has an external thread 68 for threadedly receiving the cover member 60, which has a mating internal thread (not shown). The outer member 52 has a pair of mounting flanges or members 80. Each of the mounting flanges 80 has a non-threaded hole for receiving one of the fasteners 30. In this way, the outer member 52 is rigidly fixed to the movable member 34. In the mounted position, the damper support portion 34a of the movable member 34 is disposed between the outer member 52 and the chain guide 22 with respect to the axis direction of the rotational axis A.

Figure 9:
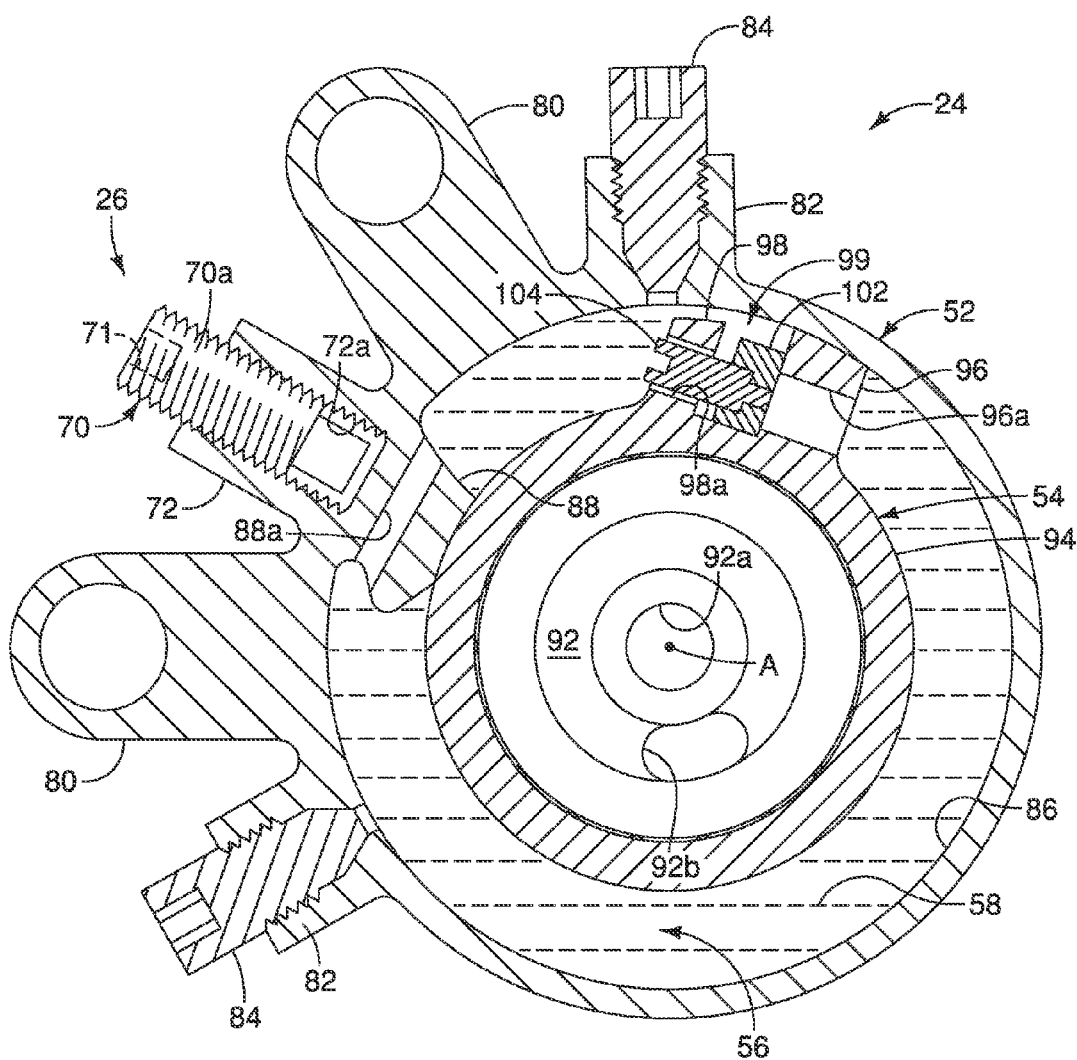
FIG. 9 is a transverse cross sectional view of the rotary fluid damper unit illustrated in FIGS. 1 to 8 as viewed along a section line that perpendicular to the rotational axis of the chain guide with the permanent magnet in a first position.
Figure 10:
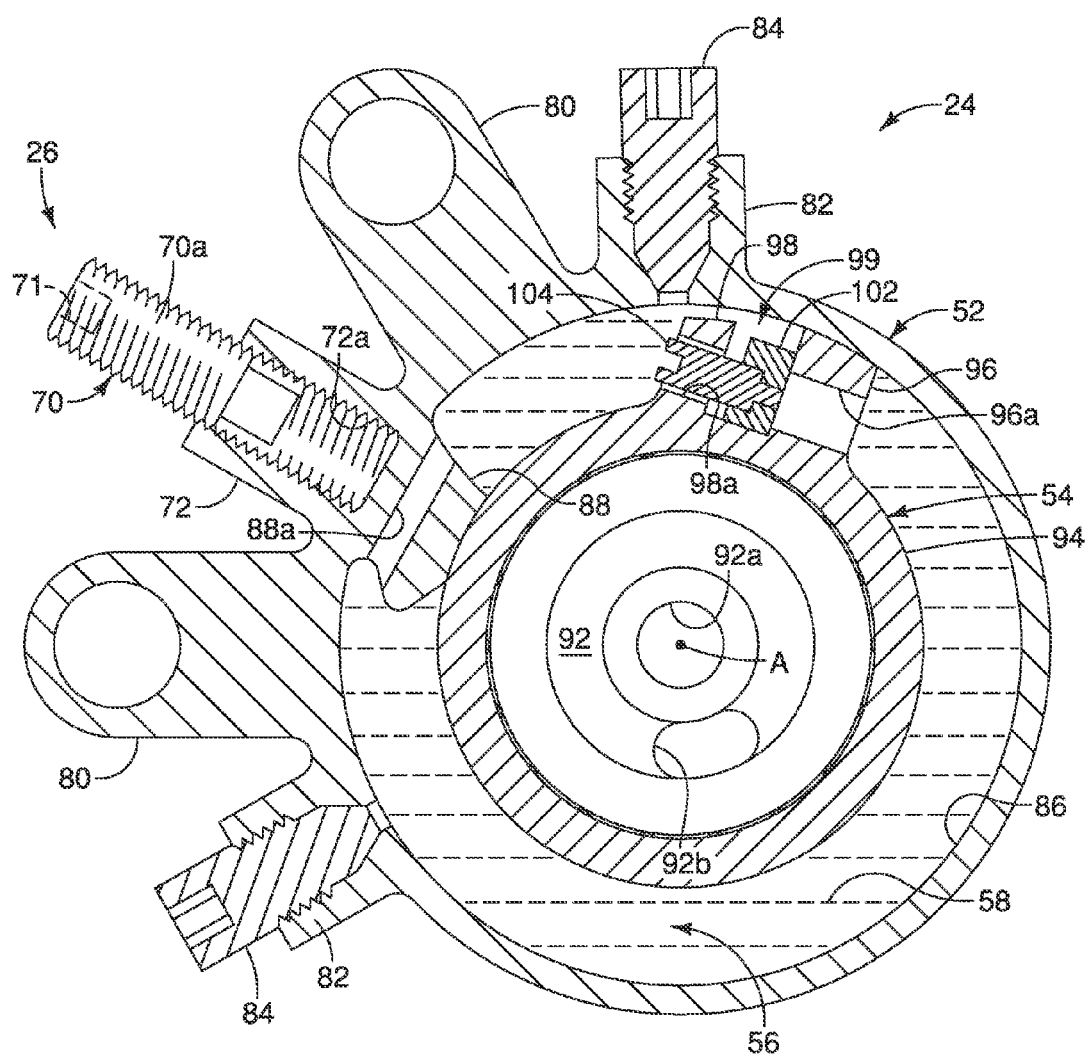
FIG. 10 is a transverse cross sectional view of the rotary fluid damper unit illustrated in FIGS. 1 to 9 as viewed along a section line that perpendicular to the rotational axis of the chain guide with the permanent magnet in a second position.
Figure 11:
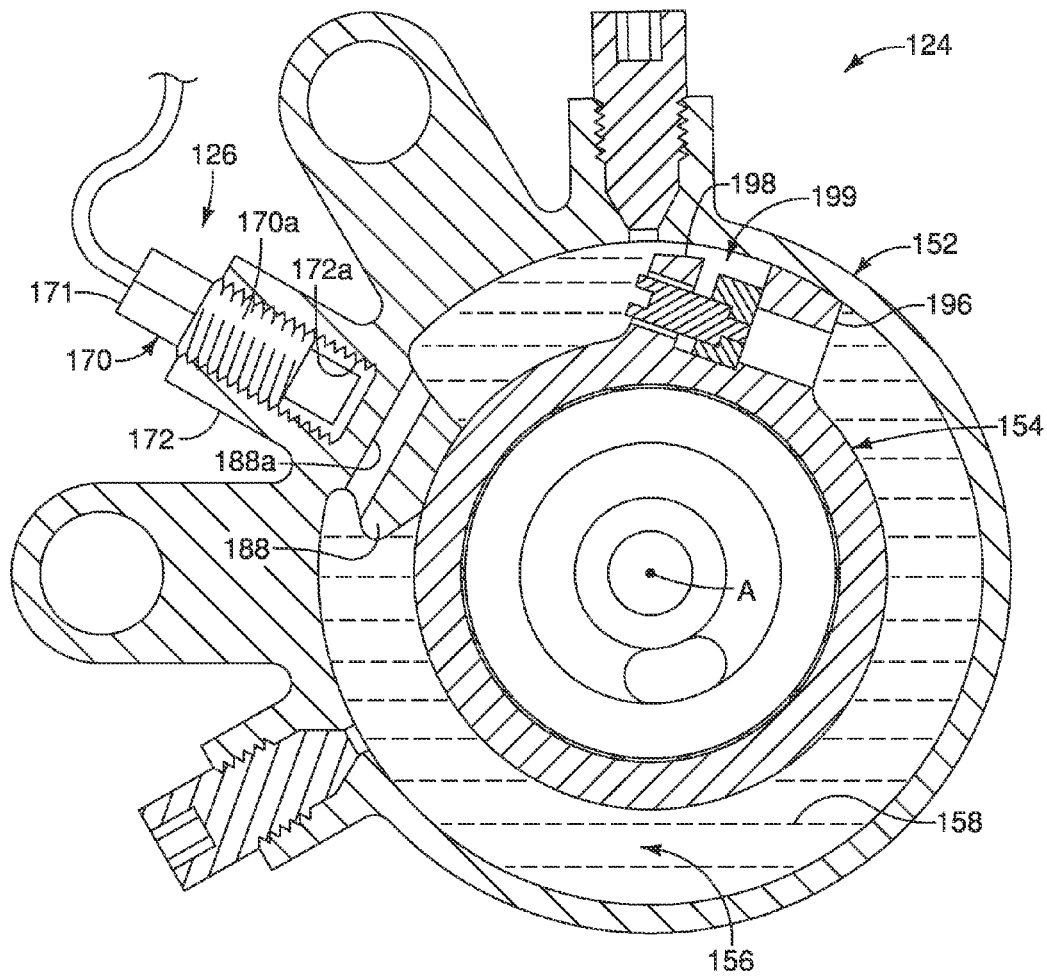
FIG. 11 is a transverse cross sectional view, similar to FIG. 9, of a rotary fluid damper unit utilizing an electromagnet instead of a permanent magnet as a part of the rotational resistance adjustment device.

Still referring to FIGS. 7, 9 and 10, the outer member 52 also has a pair of bleed valve ports 82. Each of the bleed valve ports 82 has a bleed valve 84 threadedly attached to the bleed valve ports 82 of the outer member 52 for adding fluid and/or bleeding air from the fluid cavity 56. Thus, preferably, the rotary fluid damper unit 24 includes at least one fluid bleed valve. The outer member 52 has a cylindrical inner surface 86 that defines an outer periphery of the fluid cavity 56. The cylindrical inner surface 86 has a flange or projection 88 that is in sliding contact with the inner member 54. Here, the projection 88 is an axially extending rib that has a flow limiting orifice 88a. Here, the flow limiting orifice 88a is an elongated opening or slot that is used in conjunction with the rotational resistance adjustment device 26 to control the damping characteristics.

More preferably, the magnet support member 72 is disposed in radial alignment with the flow limiting orifice 88a with respect to the rotational axis A. In this way, the permanent magnet 70 is adjustably mounted to the rotary fluid damper unit 24 between at a first position and a second position to change a distance of the permanent magnet 70 from the flow limiting orifice 88a of the rotary fluid damper unit 24. Thus, the flow characteristics of the magnetorheological fluid 58 flowing through the flow limiting orifice 88a of the rotary fluid damper unit 24 can be controlled.

Also preferably, the permanent magnet 70 is detachably mounted to the rotary fluid damper unit 24 so that the permanent magnet 70 can be completely removed and replaced with a stronger or weaker permanent magnet. In this way, the damping characteristics of the rotary fluid damper unit 24 can be adjusted by selecting one magnet out of a plurality of permanent magnets to obtain the desired damping characteristics. Of course, selectively removing and installing the permanent magnet 70 an ON/OFF arrangement of the magnetic field that is produced by the permanent magnet 70. In other words, the rotary fluid damper unit 24 in its simplest form merely changes between two states (i.e., a first rotational resistance in which the permanent magnet 70 affect the flow characteristics of the magnetorheological fluid 58 and a second rotational resistance in which the permanent magnet 70 is removed so that the flow characteristics of the magnetorheological fluid 58 is unaffected by the permanent magnet 70).

The flow limiting orifice 88a is disposed on the outer member 52 in the first embodiment. However, it will be apparent that from this disclosure that the inner member 54 can have a barrier with a flow limiting orifice instead of the outer member 52. Moreover, it will be apparent that from this disclosure that both the outer member 52 and the inner member 54 can have a barrier with a flow limiting orifice if needed and/or desired. Preferably, at least one of the outer member 52 and the inner member 54 has a flow limiting orifice.

Still referring to FIGS. 7, 9 and 10, the inner member 54 is a rigid member that is made of a suitable material such as a lightweight metal or a reinforced plastic. The inner member 54 includes an anti-rotation portion 90 that extends outside of the outer member 52 in an axis direction of the rotational axis A. The inner member 54 extends through the opening 34b in the movable member 34 of the main body 20. The anti-rotation portion 90 has a non-circular peripheral surface that mates with the recess 49a of the outer chain cage plate 45 such that the inner member 54 is non-rotatably fixed to the outer chain cage plate 45. The chain guide 22 is coupled to the portion 90 of the inner member 54. The attachment portion 49 of the outer chain cage plate 45 extends inside of the opening 34b of the main body 20. The opening 34b of the main body 20 has a circular shape. An outer diameter of the attachment portion 49 of the outer chain cage plate 45 is slightly smaller than a diameter of opening 34b of the main body 20.

The inner member 54 has an end wall 92 with a threaded hole 92a for threadedly receiving the fastener 50 to fix the outer chain cage plate 45 to the inner member 54. The end wall 92 also has an opening 92b in which the first end 40a of the biasing element 40 pass through so that the first end 40a of the biasing element 40 engages the opening 49d in the outer chain cage plate 45 of the chain guide 22. As a result, the inner member 54 constitutes a pivot shaft of the chain guide 22 that pivotally supports the chain guide 22 on the movable member 34 of the main body 20.

The inner member 54 further includes a cylindrical outer surface 94 that defines an inner periphery of the fluid cavity 56 (FIG. 9). The cylindrical outer surface 94 has a first flange or projection 96 and a second flange or projection 98 that is in sliding contact with the cylindrical inner surface 86. The first projection 96 is located near the second projection 98. Here, the first projection 96 is an axially extending rib that has a flow limiting orifice 96a. Here, the flow limiting orifice 96a is an elongated opening or slot that is used in conjunction with the one-way valve element 99 to control the damping characteristics. The one-way valve element 99 includes a control plate 102 and a pair of mounting pins 104. The mounting pins 104 are attached to the control plate 102. In the illustrated embodiment, the mounting pins 104 are screws that are attached to the control plate 102. The second projection 98 has an opening 98a that receives the head portions of the mounting pins 104 to support the control plate 102 of the one-way valve element 99 in between the first and second projections 96 and 98.

The flow limiting orifice 96a of the first projection 96 and the control plate 102 cooperate together to form a one-way valve in which rotational resistance of the inner member 54 increases in the second rotational direction R2 with respect to the first rotational direction R1. The projections 88 and 96 effectively divide the fluid cavity 56 into two chambers. As the inner member 54 rotates one of the chambers becomes smaller while the other chamber becomes larger. This rotation of the inner member 54 relative to the outer member 52 forces the magnetorheological fluid 58 to flow from one chamber to the other chamber through either both of the flow limiting orifices 88a and 96a, or only the flow limiting orifice 88a.

The characteristics of both the magnetorheological fluid 58 and the fluid paths of the flow limiting orifices 88a and 96a determine how quickly the magnetorheological fluid 58 flows between the chambers and consequently how quickly the chain guide 22 may move and adjust chain tension. For example, for any given fluid, a larger fluid path will allow for quicker fluid flow than a smaller fluid path, allowing for quicker rotation of the chain guide 22. Likewise, for any given fluid path configuration, a less viscous fluid will flow more quickly through the fluid path than a more viscous fluid, allowing for quicker rotation of the guide 22. Other fluid characteristics such as compressibility, and fluid path characteristics such as shape, may affect fluid flow rates and consequently the performance characteristics of the rotary fluid damper unit 24. Accordingly, the damping characteristics of the rotary fluid damper unit 24 can, for example, be initially set by designing the fluid paths of the flow limiting orifices 88a and 96a with prescribed sizes and/or shapes and selecting a fluid viscosity to obtain the desired damping characteristics.

In particular, as the inner member 54 rotates in the second rotational direction R2, the magnetorheological fluid 58 applies a reaction force on the control plate 102 such that the control plate 102 is pushed against the first projection 96 to close off the flow limiting orifice 96a. As a result, the force to rotate the inner member 54 increases in the second rotational direction R2 with respect to the first rotational direction R1. On the other hand, as the inner member 54 rotates in the first rotational direction R1, the magnetorheological fluid 58 applies a reaction force on the control plate 102 such that the control plate 102 is pushed against the second projection 98 to open the flow limiting orifice 96a. As a result, the force to rotate the inner member 54 decreases in the first rotational direction R1 with respect to the second rotational direction R2. By adjusting the magnetic field of the permanent magnet 70 to change the flow characteristics of the magnetorheological fluid 58, the damping characteristics of rotary fluid damper unit 24 can be more finely tuned without dissembling the rotary fluid damper unit 24 and/or removing the rotary fluid damper unit 24 from the movable member 34. The size, shape and other characteristics of the flow limiting orifice 88a limit the flow of the magnetorheological fluid 58 from one chamber to another, thereby limiting the rotational speed of the inner member 54 relative to the outer member 52. Accordingly, the damping characteristics of the rotary fluid damper unit 24 can be initially set by designing flow limiting orifice 96a with a prescribed size and/or shape to obtain the desired damping characteristics for the one-way valve element 99.

As can be understood from FIGS. 6 and 7, the spring phase adjustment element 62 and the spring engagement element 64 are attached to the cover member 60 by the fasteners 66. In particular, the cover member 60 is provided with a pair of threaded holes 60a for threadedly receiving the fasteners 66. The heads of the fasteners 66 engage a flange 62a of the spring phase adjustment element 62 to prevent relative axial movement of the spring phase adjustment element 62 with respect to the cover member 60. The cover member 60 also has a non-circular opening 60b for receiving and engaging a non-circular portion 62b of the spring phase adjustment element 62. The non-circular portion 62b of the spring phase adjustment element 62 mates with the non-circular opening 60b of the cover member 60 to prevent relative rotational movement.

The spring engagement element 64 includes a tool operating portion 64a and a spring engagement portion 64b. The spring engagement portion 64b has a slot that receives the second end 40b of the biasing element 40 to operatively connect the second end 40b of the biasing element 40 to the movable member 34 of the main body 20. In particular, the spring engagement element 64 is attached to the spring phase adjustment element 62 by a bayonet type of connection. In other words, the spring engagement portion 64b of the spring engagement element 64 is inserted into a non-circular opening 62c of the spring phase adjustment element 62, and then the spring engagement portion 64b is twisted in the counter-clockwise direction, as viewed from the non-frame facing side of the cover member 60, in order to lock the spring engagement element 64 to the spring phase adjustment element 62. The second end 40b of the biasing element 40 also applies a biasing force on the spring engagement element 64 in the counter-clockwise direction, as viewed from the non-frame facing side of the cover member 60, in order to maintain the spring engagement element 64 in the locked position.

Figure 8:
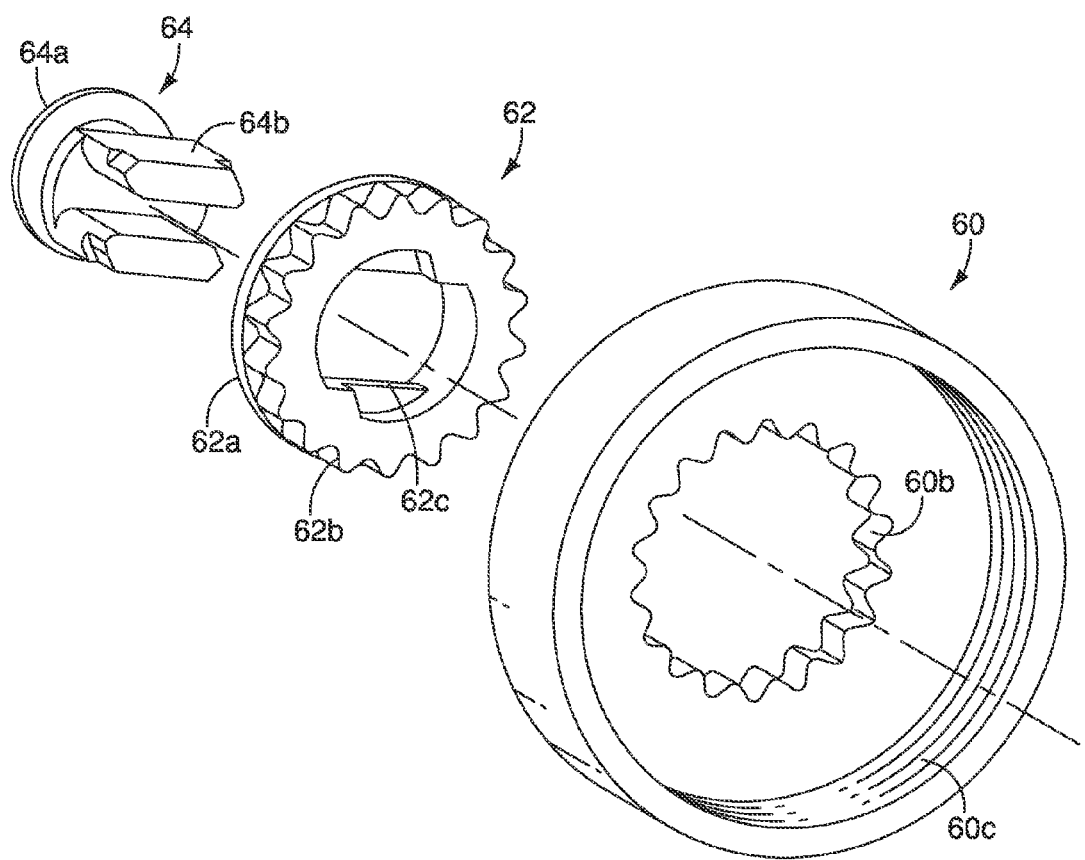
FIG. 8 is an exploded perspective view of selected parts of the rotary fluid damper unit illustrated in FIGS. 1 to 7 as viewed from the frame facing side of the rotary fluid damper unit.

As seen in FIG. 8, the cover member 60 has an internal thread 60c. The internal thread 60c of the cover member 60 threadedly engages the external thread 68 of the outer member 52 (FIG. 7) for securing the cover member 60 to the outer member 52. In this way, the second end 40b of the biasing element 40 is operatively connected to the outer member 52 and thus, the movable member 34.

The biasing force of the biasing element 40 can be adjusted by changing the relative position of the spring phase adjustment element 62 with respect to the cover member 60. In particular, the non-circular portion 62b of the spring phase adjustment element 62 mates with the non-circular opening 60b of the cover member 60 in a plurality of different angular positions. To change the angular position of the spring phase adjustment element 62 with respect to the cover member 60, the fasteners 66 are loosened so that the non-circular portion 62b of the spring phase adjustment element 62 moves axially out of the non-circular opening 60b of the cover member 60. Then, the spring phase adjustment element 62 is rotated relative to the cover member 60 so that the spring phase adjustment element 62 is in a different angular position with respect to the cover member 60. Since the spring engagement element 64 is attached to the spring phase adjustment element 62, the spring engagement element 64 is moved to a new angular position along with the second end 40b of the biasing element 40. Finally, the fasteners 66 are tightened to firmly seat the non-circular portion 62b of the spring phase adjustment element 62 in the non-circular opening 60b of the cover member 60. Preferably, the fasteners 66 are configured so that the fasteners 66 remain attached to the cover member 60 while the non-circular portion 62b of the spring phase adjustment element 62 moves axially out of the non-circular opening 60b of the cover member 60 and then rotates relative to the cover member 60 during this adjustment.

Referring now to FIG. 1, a rotary fluid damper unit 124 in accordance with a first modification will now be explained. The rotary fluid damper unit 124 is mounted on the movable member 34 in place of the rotary fluid damper unit 24. Here, the rotary fluid damper unit 124 is identical to the rotary fluid damper unit 24, except that the permanent magnet 70 of the rotational resistance adjustment device 26 has been replaced with a rotational resistance adjustment device 126 which includes an electromagnet 170. In other words, the rotary fluid damper unit 124 includes an outer member 152 that is identical to the outer member 52 and an inner member 154 that is identical to the inner member 54. The outer member 152 and the inner member 154 define a cavity 156 that is filled with a magnetorheological fluid 158. Also the outer member 152 includes a projection 188, while the inner member 154 includes projections 196 and 198 that support a one-way valve element 199. In view of the similarity between the rotary fluid damper unit 24 and the rotary fluid damper unit 124, the descriptions of the parts of the rotary fluid damper unit 124 that are identical to the parts of the rotary fluid damper unit 24 will be omitted for the sake of brevity.

Here, the electromagnet 170 is arranged to produce a magnetic field in the magnetorheological fluid 158. This allows the damping characteristics of the rotary fluid damper unit 124 to be continuously controlled, if desired, by varying the power of the electromagnet 170 using a controller (not shown). More preferably, the electromagnet 170 is disposed in radial alignment with a flow limiting orifice 188a with respect to the rotational axis A. When using the permanent magnet 70 in the rotary fluid damper unit 24, the degree of rotational resistance is the same for both rotational directions of the chain guide 22 about the rotational axis A. However, in the case of using the electromagnet 170 in the rotational resistance adjustment device 126, the electromagnet 170 can be operatively connected to rotational sensor which senses a rotation direction of the chain guide 22. In this way, the strength of the magnetic field produced by the electromagnet 170 can be changed such that so that the rotary fluid damper unit 124 provides a higher degree of rotational resistance in the second rotational direction R2.

The rotational resistance adjustment device 126 includes a magnet support member 172 for attaching the electromagnet 170 to the outer member 152. Here, the magnet support member 172 is integrally formed with the outer member 152 as a one-piece, unitary member. In particular, the magnet support member 172 is a tube with an internal thread 172a that is threadedly engaged with an external thread 170a of the electromagnet 170. The electromagnet 170 includes a tool engagement portion 171 that is engaged with a tool for installing the electromagnet 170 into the support member 172.

Figure 12:
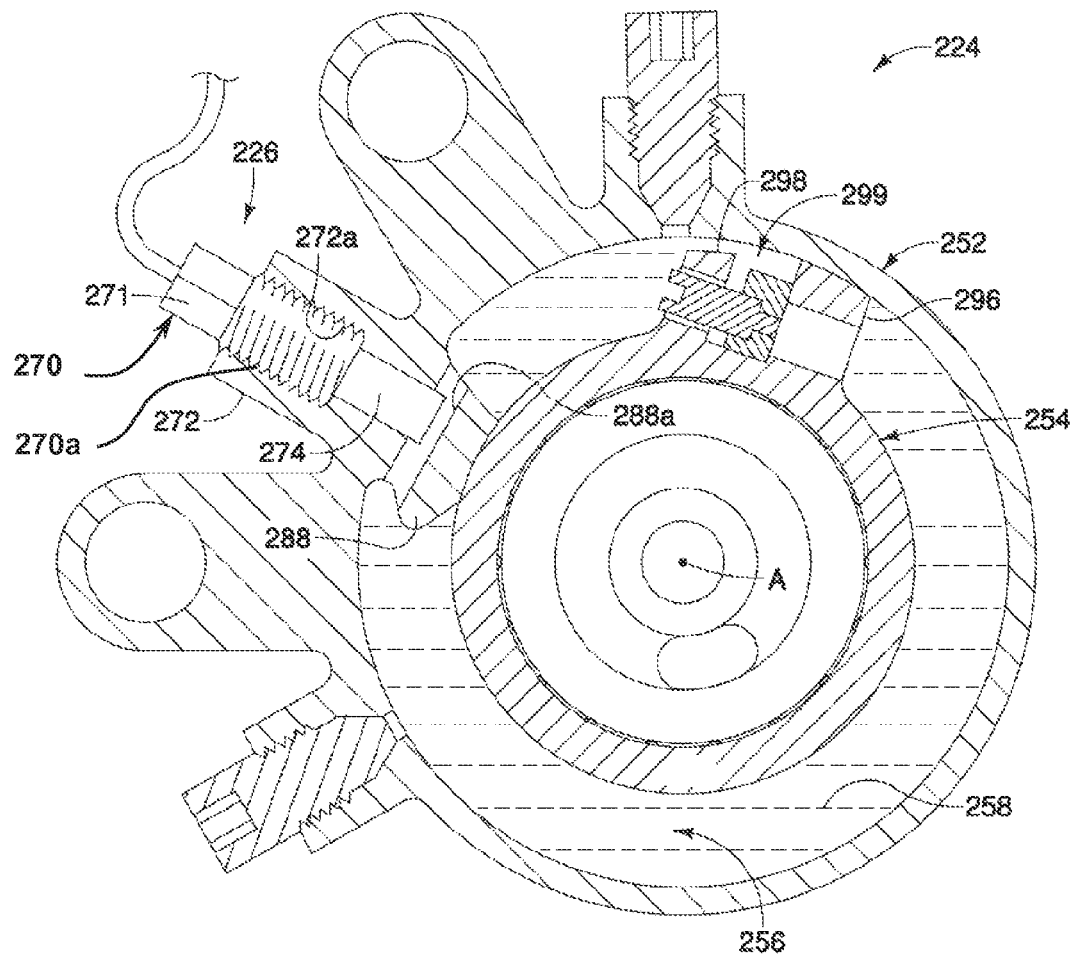
FIG. 12 is a transverse cross sectional view, similar to FIG. 9, of a rotary fluid damper unit utilizing an orifice regulator operated by an actuator to change a size of a flow limiting orifice.

Referring now to FIG. 12, a rotary fluid damper unit 224 in accordance with a second modification will now be explained. The rotary fluid damper unit 224 is mounted on the movable member 34 in place of the rotary fluid damper unit 24. Here, the rotary fluid damper unit 224 is identical to the rotary fluid damper unit 24, except that the permanent magnet 70 of the rotational resistance adjustment device 26 has been replaced with a rotational resistance adjustment device 226, which includes an orifice regulator 270. In other words, the rotary fluid damper unit 224 includes an outer member 252 that is slightly modified from the outer member 52 and an inner member 254 that is identical to the inner member 54. The outer member 252 and the inner member 254 define a cavity 256 that is filled with a fluid 258. Also the outer member 252 includes a projection 288, while the inner member 254 includes projections 296 and 298 that support a one-way valve element 299. In view of the similarity between the rotary fluid damper unit 24 and the rotary fluid damper unit 224, the descriptions of the parts of the rotary fluid damper unit 224 that are identical to the parts of the rotary fluid damper unit 24 will be omitted for the sake of brevity.

The orifice regulator 270 changes a size of a flow limiting orifice 288a of the outer member 252. As illustrated, the orifice regulator 270 is an electrically operated adjustable member. As illustrated, the orifice regulator 270 includes an electric actuator 271 and a plunger or bolt 274 that is operatively connected to the actuator 271. The bolt 274 is movably mounted relative to the outer member 252 to change the size of the flow limiting orifice 288a of the outer member 252 in response to energization of the actuator 271. In other words, the actuator 271 includes a linear movement mechanism that extends and retracts the bolt 274 to change the size of the flow limiting orifice 288a of the outer member 252. The bolt 274 extends through a part of the outer member 252 to extend into the flow limiting orifice 288a of the outer member 252. The actuator 271 can automatically adjust the orifice regulator 270 based on a sensor that detects the rotational direction of the chain guide 22, or can be manually energized by a remotely located control device as needed and/or desired.

The rotational resistance adjustment device 226 includes a support member 272 for attaching the orifice regulator 270 to the outer member 252. Here, the support member 272 is integrally formed with the outer member 252 as a one-piece, unitary member. In particular, the support member 272 is a tube with an internal thread 272a that is threadedly engaged with an external thread 270a of the orifice regulator 270. The actuator 271 has a tool engagement portion that is engaged with a tool for installing the orifice regulator 270 into the support member 272. The fluid 258 can be a general oil (i.e., the fluid 258 does not need to be a magnetorheological fluid).

Figure 13:
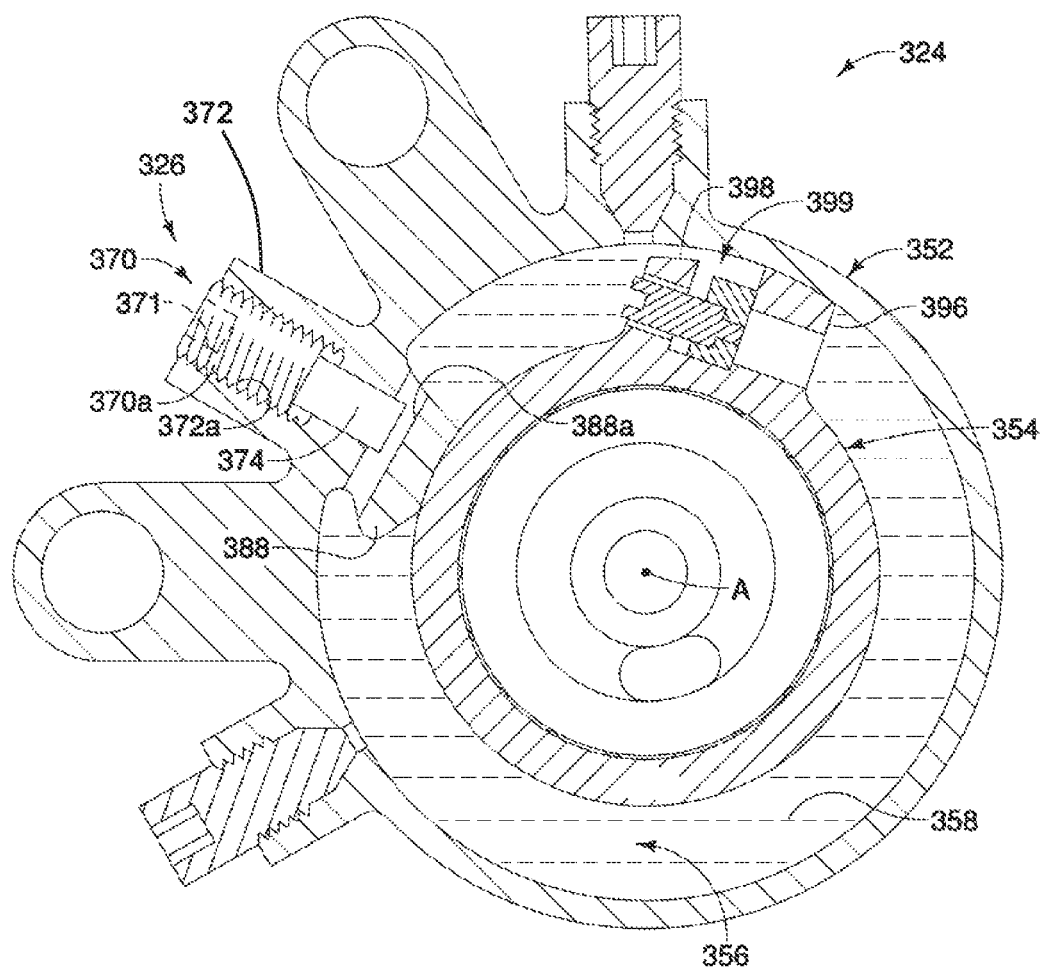
FIG. 13 is a transverse cross sectional view, similar to FIG. 9, of a rotary fluid damper unit utilizing manually operated orifice regulator by an actuator to change a size of a flow limiting orifice.

Referring now to FIG. 13, a rotary fluid damper unit 324 in accordance with a third modification will now be explained. The rotary fluid damper unit 324 is mounted on the movable member 34 in place of the rotary fluid damper unit 24. Here, the rotary fluid damper unit 324 is identical to the rotary fluid damper unit 24, except that the permanent magnet 70 of the rotational resistance adjustment device 26 has been replaced with a rotational resistance adjustment device 326, which includes an orifice regulator 370. In other words, the rotary fluid damper unit 324 includes an outer member 352 that is slightly modified from the outer member 52 and an inner member 354 that is identical to the inner member 54. The outer member 352 and the inner member 354 define a cavity 356 that is filled with a fluid 358. Also the outer member 352 includes a projection 388, while the inner member 354 includes projections 396 and 398 that support a one-way valve element 399. In view of the similarity between the rotary fluid damper unit 24 and the rotary fluid damper unit 324, the descriptions of the parts of the rotary fluid damper unit 324 that are identical to the parts of the rotary fluid damper unit 24 will be omitted for the sake of brevity.

The orifice regulator 370 changes a size of a flow limiting orifice 388a of the outer member 352. As illustrated, the orifice regulator 370 is a manually adjustable member. As illustrated, the orifice regulator 370 includes a tool engagement portion 371 and a plunger or bolt 374 that is fixedly connected to the tool engagement portion 371. The bolt 374 is movably mounted relative to the outer member 352 to change the size of the flow limiting orifice 388a of the outer member 352 in response to rotation of the engagement portion 371. In particular, a user can use a tool to manually turn the bolt 374 to extend or retract the bolt 374 with respect to the flow limiting orifice 388a to change the size of the flow limiting orifice 388a.

The rotational resistance adjustment device 326 includes a support member 372 for attaching the orifice regulator 370 to the outer member 352. Here, the support member 372 is integrally formed with the outer member 352 as a one-piece, unitary member. In particular, the support member 372 is a tube with an internal thread 372a that is threadedly engaged with an external thread 370a of the orifice regulator 370. The tool engagement portion 371 is engaged with a tool for installing the orifice regulator 370 into the support member 372. The fluid 358 can be a general oil (i.e., the fluid 358 does not need to be a magnetorheological fluid).

Figure 14:
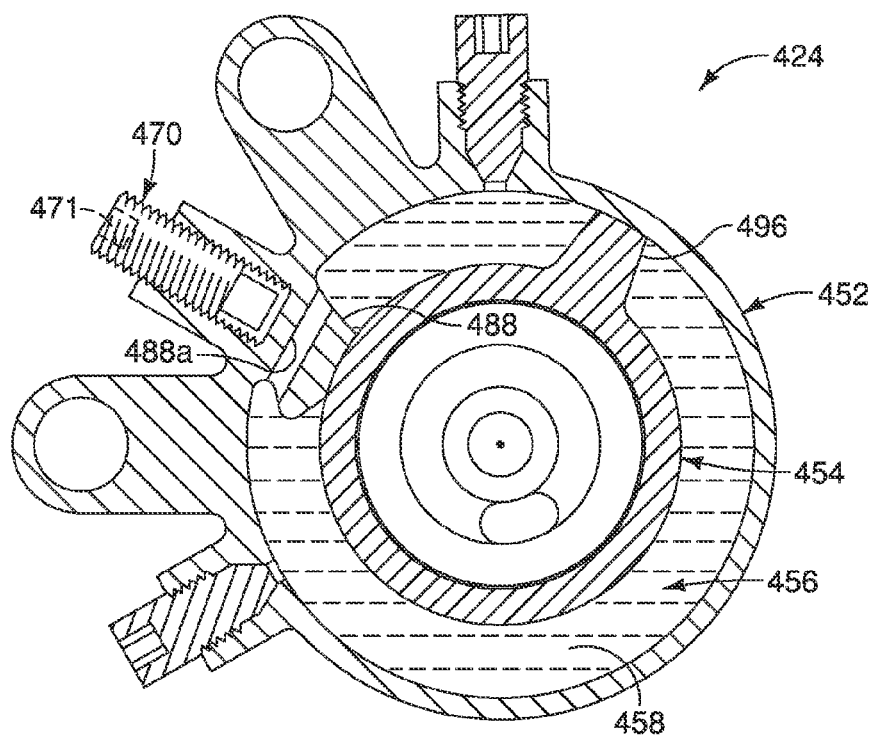
FIG. 14 is a transverse cross sectional view, similar to FIG. 9, of a rotary fluid damper unit in which the flow limiting orifice of the inner member and the one-way valve have been removed.

Referring now to FIG. 14, a rotary fluid damper unit 424 in accordance with a fourth modification will now be explained. The rotary fluid damper unit 424 is mounted on the movable member 34 in place of the rotary fluid damper unit 24. Here, the rotary fluid damper unit 424 is identical to the rotary fluid damper unit 24, except that the first and second projections 96 and 98 and the one-way valve element 99 has been replaced with a barrier 496. Thus, the rotary fluid damper unit 424 includes an outer member 452 that is identical to the outer member 52 and an inner member 454 that is slightly modified from the inner member 54. The outer member 452 and the inner member 454 define a cavity 456 that is filled with a magnetorheological fluid 458. Here, the rotary fluid damper unit 424 includes a rotational resistance adjustment device 426 having a permanent magnet 470, which is the same as the permanent magnet 70. Also, the permanent magnet 470 includes a tool engagement portion 471 that is engaged with a tool for installing the permanent magnet 470 to the outer member 452. In view of the similarity between the rotary fluid damper unit 24 and the rotary fluid damper unit 424, the descriptions of the parts of the rotary fluid damper unit 424 that are identical to the parts of the rotary fluid damper unit 24 will be omitted for the sake of brevity.

Here, the barrier 496 is substantially in sliding contact with the outer member 452 so that the magnetorheological fluid 458 does not pass between the end of the barrier 496 and the outer member 452. In this way, the magnetorheological fluid 458 is pushed through a flow limiting orifice 488a of a projection 488, which is disposed on the outer member 452, by the barrier 496 as the inner member 454 rotates relative to the outer member 452.

Figure 15:
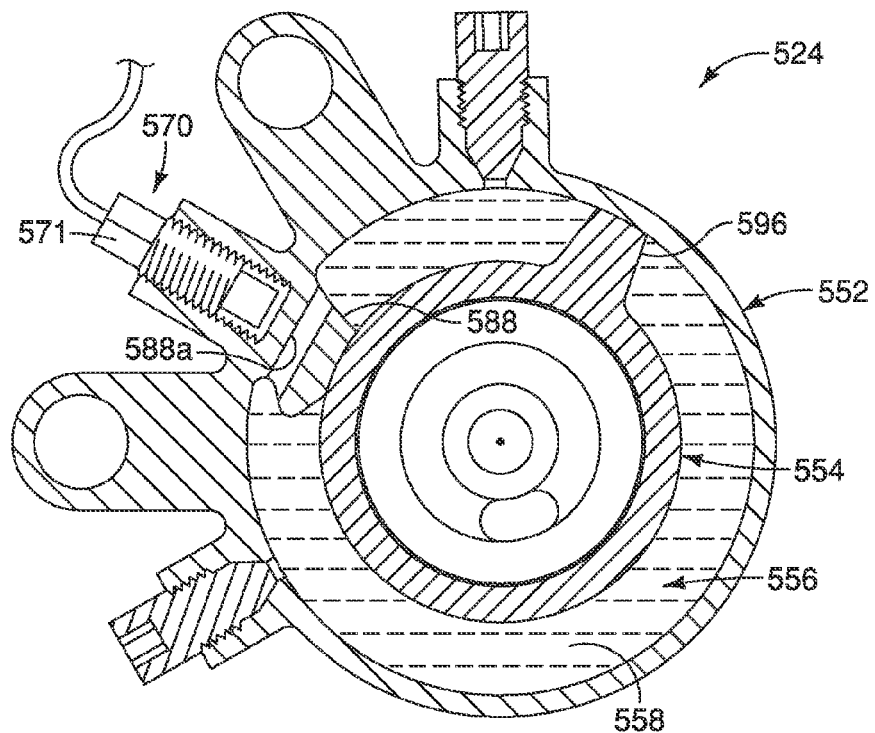
FIG. 15 is a transverse cross sectional view, similar to FIG. 11, of a rotary fluid damper unit in which the flow limiting orifice of the inner member and the one-way valve have been removed.

Referring now to FIG. 15, a rotary fluid damper unit 524 in accordance with a fifth modification will now be explained. The rotary fluid damper unit 524 is mounted on the movable member 34 in place of the rotary fluid damper unit 24. Here, the rotary fluid damper unit 524 is identical to the rotary fluid damper unit 124, except that the first and second projections 196 and 198 and the one-way valve element 199 have been replaced with a barrier 596. Thus, the rotary fluid damper unit 524 includes an outer member 552 that is identical to the outer member 52 and an inner member 554 that is slightly modified from the inner member 54. The outer member 552 and the inner member 554 define a cavity 556 that is filled with a magnetorheological fluid 558. Here, the rotary fluid damper unit 524 includes a rotational resistance adjustment device 526 having an electromagnet 570, which is the same as the electromagnet 170. Also, the electromagnet 570 includes a tool engagement portion 571 that is engaged with a tool for installing the electromagnet 570 to the outer member 552. In view of the similarity between the rotary fluid damper unit 124 and the rotary fluid damper unit 524, the descriptions of the parts of the rotary fluid damper unit 524 that are identical to the parts of the rotary fluid damper unit 124 will be omitted for the sake of brevity.

Here, the barrier 596 is substantially in sliding contact with the outer member 552 so that the magnetorheological fluid 558 does not pass between the end of the barrier 596 and. the outer member 552. In this way, the magnetorheological fluid 558 is pushed through a flow limiting orifice 588a of a projection 588, which is disposed on the outer member 552, by the barrier 596 as the inner member 554 rotates relative to the outer member 552.

Figure 16:
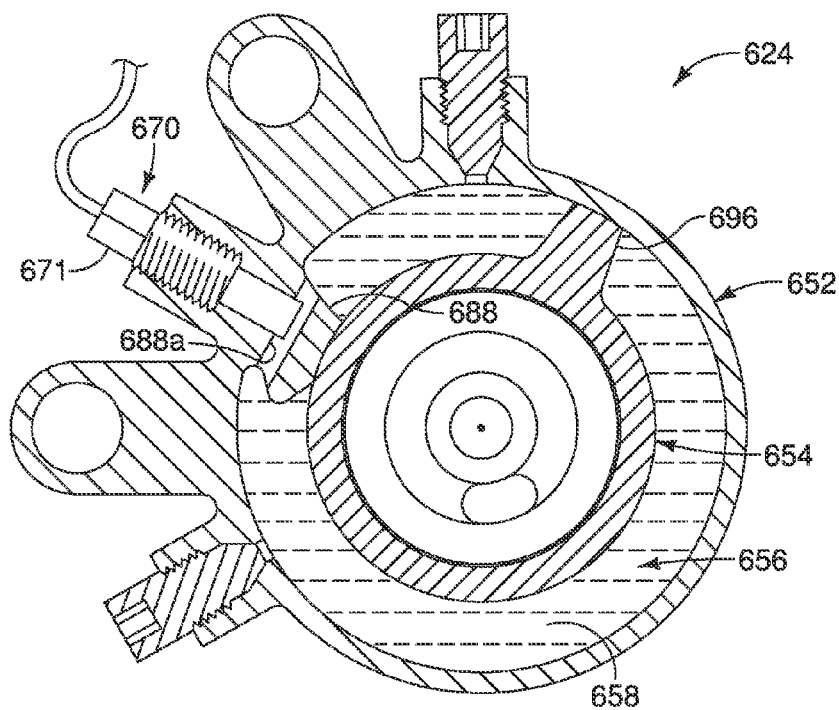
FIG. 16 is a transverse cross sectional view, similar to FIG. 12, of a rotary fluid damper unit in which the flow limiting orifice of the inner member and the one-way valve have been removed.

Referring now to FIG. 16, a rotary fluid damper unit 624 in accordance with a sixth modification will now be explained. The rotary fluid damper unit 624 is mounted on the movable member 34 in place of the rotary fluid damper unit 24. Here, the rotary fluid damper unit 624 is identical to the rotary fluid damper unit 224, except that the first and second projections 296 and 298 and the one-way valve element 299 have been replaced with a barrier 696. Thus, the rotary fluid damper unit 624 includes an outer member 652 that is identical to the outer member 252 and an inner member 654 that is slightly modified from the inner member 254. The outer member 652 and the inner member 654 define a cavity 656 that is filled with a fluid 658. The fluid 658 can be a general oil (i.e., the fluid 658 does not need to be a magnetorheological fluid).

Here, the rotary fluid damper unit 624 includes a rotational resistance adjustment device 626 having an orifice regulator 670, which is the same as the orifice regulator 270. Also, the orifice regulator 670 includes a tool engagement portion 671 that is engaged with a tool for installing the orifice regulator 670 to the outer member 652. In view of the similarity between the rotary fluid damper unit 224 and the rotary fluid damper unit 624, the descriptions of the parts of the rotary fluid damper unit 624 that are identical to the parts of the rotary fluid damper unit 224 will be omitted for the sake of brevity.

Here, the barrier 696 is substantially in sliding contact with the outer member 652 so that the fluid 658 does not pass between the end of the barrier 696 and the outer member 652. In this way, the fluid 658 is pushed through a flow limiting orifice 688a of a projection 688, which is disposed on the outer member 652, by the barrier 696 as the inner member 654 rotates relative to the outer member 652.

Figure 17:
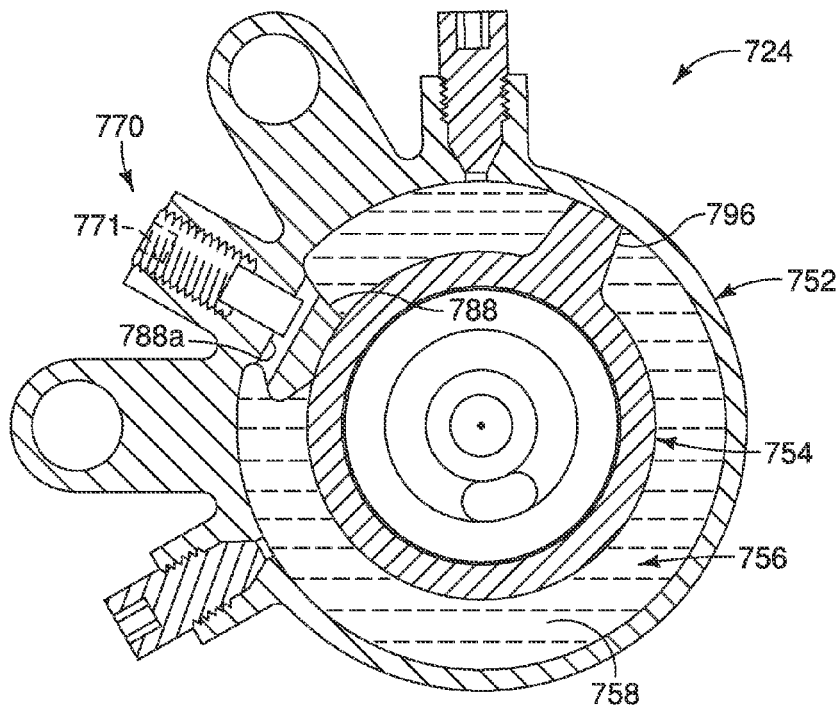
FIG. 17 is a transverse cross sectional view, similar to FIG. 13, of a rotary fluid damper unit in which the flow limiting orifice of the inner member and the one-way valve have been removed.

Referring now to FIG. 17, a rotary fluid damper unit 724 in accordance with a seventh modification will now be explained. The rotary fluid damper unit 724 is mounted on the movable member 34 in place of the rotary fluid damper unit 24. Here, the rotary fluid damper unit 724 is identical to the rotary fluid damper unit 324, except that the first and second projections 396 and 398 and the one-way valve element 399 have been replaced with a barrier 796. Thus, the rotary fluid damper unit 724 includes an outer member 752 that is identical to the outer member 352 and an inner member 754 that is slightly modified from the inner member 354. The outer member 752 and the inner member 754 define a cavity 756 that is filled with a fluid 758. The fluid 758 can be a general oil (i.e., the fluid 758 does not need to be a magnetorheological fluid). Here, the rotary fluid damper unit 724 includes a rotational resistance adjustment device 726 having an orifice regulator 770, which is the same as the orifice regulator 370. Also, the orifice regulator 770 includes a tool engagement portion 771 that is engaged with a tool for installing the orifice regulator 770 to the outer member 752. In view of the similarity between the rotary fluid damper unit 324 and the rotary fluid damper unit 724, the descriptions of the parts of the rotary fluid damper unit 724 that are identical to the parts of the rotary fluid damper unit 324 will be omitted for the sake of brevity.

Here, the barrier 796 is substantially in sliding contact with the outer member 752 so that the fluid 758 does not pass between the end of the barrier 796 and the outer member 752. In this way, the fluid 758 is pushed through a flow limiting orifice 788a of a projection 788, which is disposed on the outer member 752, by the barrier 796 as the inner member 754 rotates relative to the outer member 752.

Figure 18:
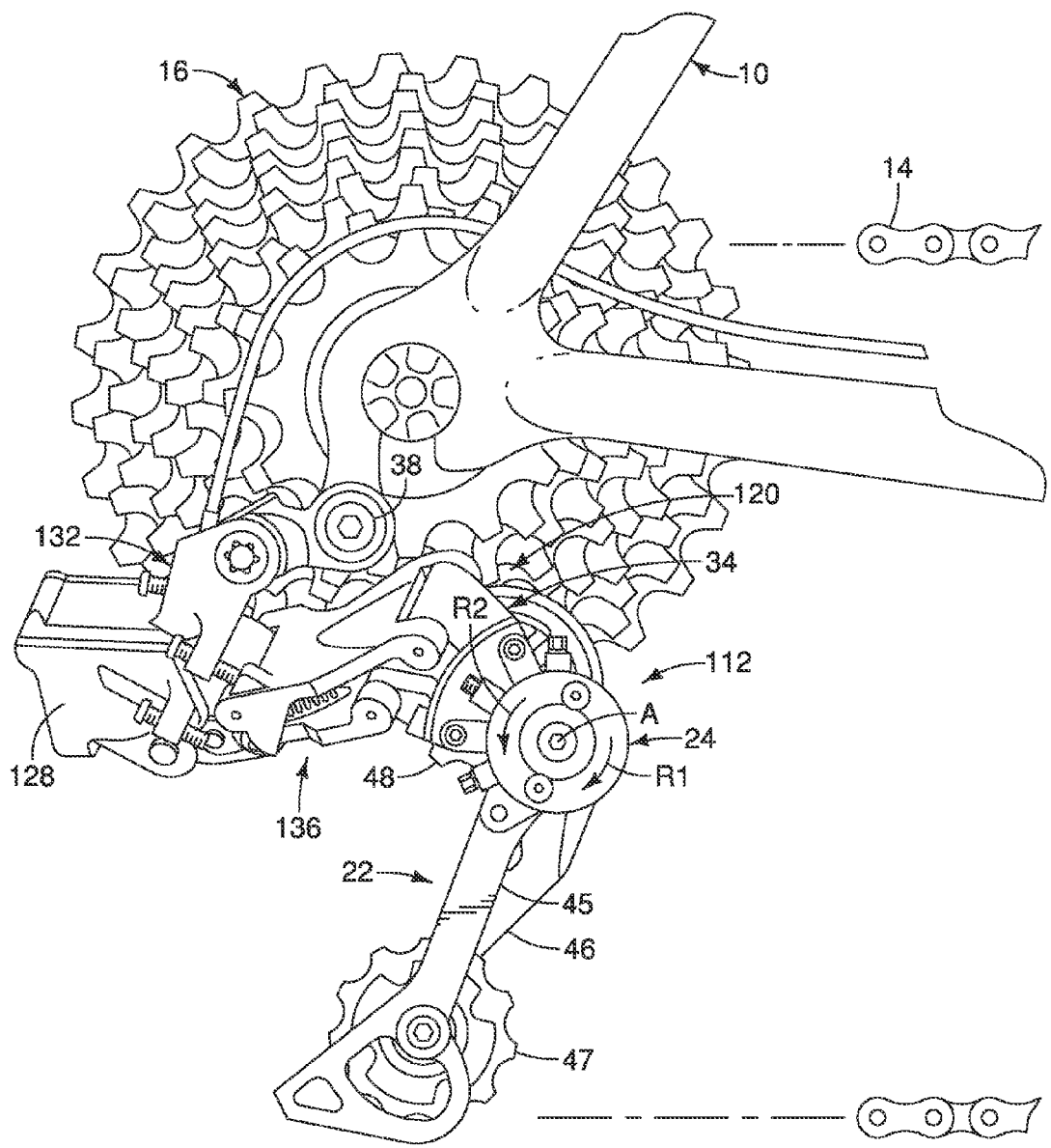
FIG. 18 is a side elevational view of a bicycle rear derailleur (i.e., a chain tensioning device) in accordance with another illustrated embodiment.

As seen in FIG. 18, the rotary fluid damper unit 24 can be used in an electric rear derailleur 112. The electric rear derailleur 112 uses the movable member 34 and the chain guide 22 of the rear derailleur 12. Thus, the parts of the electric rear derailleur 112 that are identical to parts of the rear derailleur 12 will be given the same reference numerals. The electric rear derailleur 112 basically includes a reversible electric motor 128, a main body 120, the chain guide 22 and the rotary fluid damper unit 24. The main body 120 includes a base member 132, the movable member 34 and a moving structure 136. The motor 128 is mounted to the base member 132. The motor 128 has an output shaft that is operatively coupled to the moving structure 136. In the illustrated embodiment of the electric rear derailleur 112, the moving structure 136 includes a pair of links with the output shaft of the motor 128 coupled to one of the links (e.g., the inner link as shown in FIG. 18). Preferably, the moving structure 136 includes a biasing element that biases the links to either the low shift stage (gear) position or the top shift stage (gear) position. Since electric rear derailleurs are known in the bicycle field, the electric rear derailleur 112 will not be discussed and/or illustrated in further detail herein.

While only the rotary fluid damper unit 24 is illustrated as being used with an electric rear derailleur, it will be apparent to those skilled in the art from this disclosure that anyone of the rotary fluid damper units disclosed herein can be used with an electric rear derailleur such as the one shown in FIG. 18. Also, the rotary fluid damper units disclosed herein can be used with other types of rear derailleurs such a pneumatic rear derailleurs and hydraulic rear derailleurs.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward". "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the chain tensioning device. Accordingly, these directional terms, as utilized to describe the chain tensioning device should be interpreted relative to a bicycle in an upright riding position on a horizontal surface and that is equipped with the chain tensioning device. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as the changes do not substantially affect their intended function. Components that are shown directly connected or contacting each other can have intermediate structures disposed between them so long as the changes do not substantially affect their intended function. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A chain tensioning device comprising:
   a main body configured to be mounted to a bicycle;
   a chain guide pivotally coupled to the main body to rotate around a rotational axis with respect to the main body in a first rotational direction and a second rotational direction opposite the first rotational direction;
   a rotary fluid damper unit operatively connected between the main body and the chain guide to provide rotational resistance to the chain guide around the rotational axis, the rotary fluid damper unit including an outer member and an inner member arranged radially inwardly of the outer member, the outer member and the inner member defining a fluid cavity that is filled with a fluid; and a rotational resistance adjustment device that is arranged on the outer member and operatively connected to the rotary fluid damper unit to change a rotational resistance setting of the rotary fluid damper unit with the rotational resistance adjustment device in an operative state, the rotational resistance adjustment device being isolated from the fluid cavity, the rotational resistance setting being changed with respect to rotation of the chain guide in both of the first and second rotational directions around the rotational axis.

2. The chain tensioning device according to claim 1, wherein the rotational resistance adjustment device is configured to be operated from outside of the rotary fluid damper unit.

3. The chain tensioning device according to claim 1, wherein the rotary fluid damper unit includes a magnetorheological fluid, and the rotational resistance adjustment device includes an electromagnet that is arranged to produce a magnetic field in the magnetorheological fluid.

4. A chain tensioning device comprising:

a main body configured to be mounted to a bicycle;

a chain guide pivotally coupled to the main body to rotate around a rotational axis with respect to the main body;

a rotary fluid damper unit operatively connected between the main body and the chain guide to provide rotational resistance to the chain guide around the rotational axis the rotary fluid damper unit includes a magnetorheological fluid, and a rotational resistance adjustment device operatively connected to the rotary fluid damper unit to change a rotational resistance setting of the rotary fluid damper unit with the rotational resistance adjustment device in an operative state, the rotational resistance adjustment device including a permanent magnet that is arranged to produce a magnetic field in the magnetorheological fluid.

5. The chain tensioning device according to claim 4, wherein the permanent magnet is adjustably mounted to the rotary fluid damper unit between at a first position and a second position to change a distance of the permanent magnet from the magnetorheological fluid.

6. The chain tensioning device according to claim 4, wherein the permanent magnet is adjustably mounted to the rotary fluid damper unit between at a first position and a second position to change a distance of the permanent magnet from a flow limiting orifice of the rotary fluid damper unit.

7. The chain tensioning device according to claim 4, wherein the permanent magnet is detachably mounted to the rotary fluid damper unit.

8. The chain tensioning device according to claim 1, wherein the outer member is fixed to the main body and the inner member is fixed to the chain guide, the inner member being rotatably disposed inside of the outer member, at least one of the outer member and the inner member having a flow limiting orifice.

9. The chain tensioning device according to claim 8, wherein the flow limiting orifice is disposed on the outer member.

10. The chain tensioning device according to claim 1, wherein the main body includes a base member, a movable member and a moving structure operatively coupled between the base member and the movable member to move the movable member and the chain guide relative to the base member, the rotary fluid damper unit being disposed on the movable member.

11. The chain tensioning device according to claim 10, wherein the outer member is fixed to the movable member and the inner member is fixed to the chain guide, the inner member being rotatably disposed inside of the outer member, at least one of the outer member and the inner member having a flow limiting orifice.

12. The chain tensioning device according to claim 1, wherein the chain guide includes at least one pulley.

13. The chain tensioning device according to claim 1, further comprising a biasing element biasing the chain guide in the first rotational direction around the rotational axis with respect to the main body, and the rotary fluid damper unit provides a higher degree of rotational resistance in the second rotational direction.

* * * * *